(12) United States Patent
Vosburgh et al.

(10) Patent No.: US 9,042,857 B2
(45) Date of Patent: May 26, 2015

(54) METHODS, SYSTEMS, AND NON-TRANSITORY COMPUTER READABLE MEDIA FOR WIDEBAND FREQUENCY AND BANDWIDTH TUNABLE FILTERING

(71) Applicant: Physical Devices, LLC, Durham, NC (US)

(72) Inventors: Frederick Vosburgh, Durham, NC (US); Charley Theodore Wilson, III, Raleigh, NC (US); Jonathan Ryan Wilkerson, Raleigh, NC (US)

(73) Assignee: PHYSICAL DEVICES, LLC, Durham, NC (US)

( * ) Notice: Subject to any disclaimer, the term of this patent is extended or adjusted under 35 U.S.C. 154(b) by 221 days.

(21) Appl. No.: 13/745,729

(22) Filed: Jan. 18, 2013

(65) Prior Publication Data

US 2013/0225099 A1 Aug. 29, 2013
US 2014/0073266 A9 Mar. 13, 2014

Related U.S. Application Data

(63) Continuation of application No. PCT/US2012/066259, filed on Nov. 21, 2012, which is a continuation-in-part of application No. 13/271,420, filed on Oct. 12, 2011, now Pat. No.

(Continued)

(51) Int. Cl.
*H04B 1/10* (2006.01)
*H04B 1/44* (2006.01)
*H04B 7/08* (2006.01)

(52) U.S. Cl.
CPC .............. *H04B 1/44* (2013.01); *H04B 1/1081* (2013.01); *H04B 7/0894* (2013.01); *H04B 1/525* (2013.01)

(58) Field of Classification Search
CPC ........................... H04B 1/0035; H04B 1/0042
USPC .............. 455/77, 87, 120, 73, 130, 213, 306, 455/307, 67.16, 180.3; 327/552, 311
See application file for complete search history.

(56) References Cited

U.S. PATENT DOCUMENTS 4,085,368 A 4/1978 Yeh
5,179,727 A 1/1993 Imagawa
(Continued)

FOREIGN PATENT DOCUMENTS

EP 1 727 277 A1 11/2006
WO WO 2012/030658 A2 3/2012
(Continued)

OTHER PUBLICATIONS

Notice of Allowance and Fee(s) Due for U.S. Appl. No. 13/271,420 (Oct. 15, 2013).

(Continued)

*Primary Examiner* — Tuan Pham
(74) *Attorney, Agent, or Firm* — Jenkins, Wilson, Taylor & Hunt, P.A.

(57) ABSTRACT

Methods, systems, and computer readable media for wideband frequency and bandwidth tunable filtering are disclosed. According to one aspect, the subject matter described herein includes a wideband frequency and bandwidth tunable filter that splits a filter input signal into first and second input signals, modifies the first input signal to produce a first output signal, modifies the second input signal to produce a second output signal having an intermediate frequency response, and combines the first and second output signals while adjusting their relative phases and/or amplitudes to produce a filter output signal with the target frequency response. Adjustment includes splitting the second input signal into third and fourth input signals, which are modified and then combined to produce the second output signal having the intermediate frequency response.

5 Claims, 14 Drawing Sheets

Related U.S. Application Data 8,666,347, which is a continuation-in-part of application No. PCT/US2011/049399, filed on Aug. 26, 2011.

(60) Provisional application No. 61/402,416, filed on Aug. 30, 2010, provisional application No. 61/510,330, filed on Jul. 21, 2011, provisional application No. 61/393,157, filed on Oct. 14, 2010, provisional application No. 61/393,163, filed on Oct. 14, 2010, provisional application No. 61/546,784, filed on Oct. 13, 2011, provisional application No. 61/719,353, filed on Oct. 26, 2012.

(56) References Cited

U.S. PATENT DOCUMENTS

| | | | |
|---|---|---|---|
| 5,252,930 A | | 10/1993 | Blauvelt |
| 5,412,735 A | | 5/1995 | Engebretson et al. |
| 5,712,641 A | | 1/1998 | Casobana et al. |
| 5,736,909 A | | 4/1998 | Hauser et al. |
| 5,783,977 A | | 7/1998 | Chethik |
| 5,872,540 A | | 2/1999 | Casobana et al. |
| 6,154,641 A | * | 11/2000 | Zhang .......................... 455/112 |
| 6,323,806 B1 | | 11/2001 | Greving |
| 6,359,503 B1 | | 3/2002 | Alini et al. |
| 6,363,263 B1 | | 3/2002 | Reudink et al. |
| 6,639,541 B1 | | 10/2003 | Quintana et al. |
| 6,710,739 B1 | | 3/2004 | Loegering |
| 6,961,577 B2 | | 11/2005 | Nagato et al. |
| 7,904,047 B2 | | 3/2011 | Darabi |
| 8,032,103 B2 | | 10/2011 | Lackey |
| 8,064,837 B2 | | 11/2011 | Sampath |
| 8,078,100 B2 | * | 12/2011 | Proctor et al. ............... 455/11.1 |
| 8,086,206 B1 | | 12/2011 | Lackey |
| 8,090,338 B1 | | 1/2012 | Lackey |
| 8,090,339 B1 | | 1/2012 | Lackey |
| 8,355,676 B2 | | 1/2013 | Franklin |
| 8,666,347 B2 | | 3/2014 | Wilkerson et al. |
| 8,682,275 B2 | | 3/2014 | Kerth et al. |
| 2003/0130751 A1 | | 7/2003 | Lim |
| 2008/0136473 A1 | | 6/2008 | Bollenbeck et al. |
| 2010/0178874 A1 | | 7/2010 | Chiou et al. |
| 2010/0244943 A1 | | 9/2010 | Hahn et al. |
| 2011/0019722 A1 | | 1/2011 | Amirkhany |
| 2011/0227665 A1 | | 9/2011 | Wyville |
| 2011/0300813 A1 | * | 12/2011 | Mirzaei et al. ................ 455/78 |
| 2012/0025929 A1 | | 2/2012 | Muterspaugh et al. |
| 2012/0201153 A1 | | 8/2012 | Bharadia et al. |
| 2012/0201173 A1 | | 8/2012 | Jain et al. |
| 2012/0252392 A1 | | 10/2012 | Wilkerson et al. |
| 2014/0152499 A1 | | 6/2014 | Vosburgh et al. |
| 2014/0199956 A1 | | 7/2014 | Wilkerson |
| 2014/0235190 A1 | | 8/2014 | Wilkerson et al. |

FOREIGN PATENT DOCUMENTS

| | | |
|---|---|---|
| WO | WO 2013/056270 A1 | 4/2013 |
| WO | WO 2013/130818 A1 | 9/2013 |
| WO | WO 2014/113613 A1 | 7/2014 |

OTHER PUBLICATIONS

Bharadia et al., "Full Duplex Radios," pp. 1-12 (Aug. 12, 2013).

Jain et al., "Practical, Real-time, Full Duplex Wireless," pp. 1-12 (Sep. 19, 2011).

U.S. Appl. No. 61/485,980 for "Adaptive Techniques for Full-Duplex Wireless," filed May 13, 2011.

U.S. Appl. No. 61/462,493 for "Single Channel Full-Duplex Wireless Communication," filed Feb. 3, 2011.

Choi et al., "Achieving Single Channel, Full Duplex Wireless Communication," pp. 1-12 (Sep. 20, 2010).

Notification of Transmittal of the International Search Report and the Written Opinion of the International Searching Authority, or the Declaration for PCT International Patent Application No. PCT/US2013/028338 (Jul. 25, 2013).

Notice of Allowance and Fee(s) Due for U.S. Appl. No. 13/271,420 (Jun. 25, 2013).

Communication of European Publication Number and Information on the Application of Article 67(3) EPC for European Patent Application No. 11822404.7 (Jun. 12, 2013).

Notification of Transmittal of the International Search Report and the Written Opinion of the International Searching Authority, or the Declaration for PCT International Patent Application No. PCT/US2012/066259 (Mar. 28, 2013).

Commonly-assigned, co-pending U.S. Appl. No. 13/781,226 for "Methods, Systems, and Computer Readable Media for Mitigation of In-Band Interference of Global Positioning System (GPS) Signals," (Unpublished, filed Feb. 28, 2013).

Non-Final Action for U.S. Appl. No. 13/271,420 (Feb. 6, 2013).

International Search Report for International Patent Application No. PCT/US2011/049399 (Mar. 2, 2012).

Communication of European Publication Number and Information on the Application of Article 67(3) EPC for European Patent Application No. 12839313.9 (Jul. 23, 2014).

Non-Final Office Action for U.S. Appl. No. 14/194,924 (Jun. 13, 2014).

Notification of Transmittal of the International Search Report and the Written Opinion of the International Searching Authority, or the Declaration for PCT International Patent Application No. PCT/US2014/011941 (Apr. 29, 2014).

Extended European Search Report for European Application No. 11822404.7 (Jan. 17, 2014).

* cited by examiner

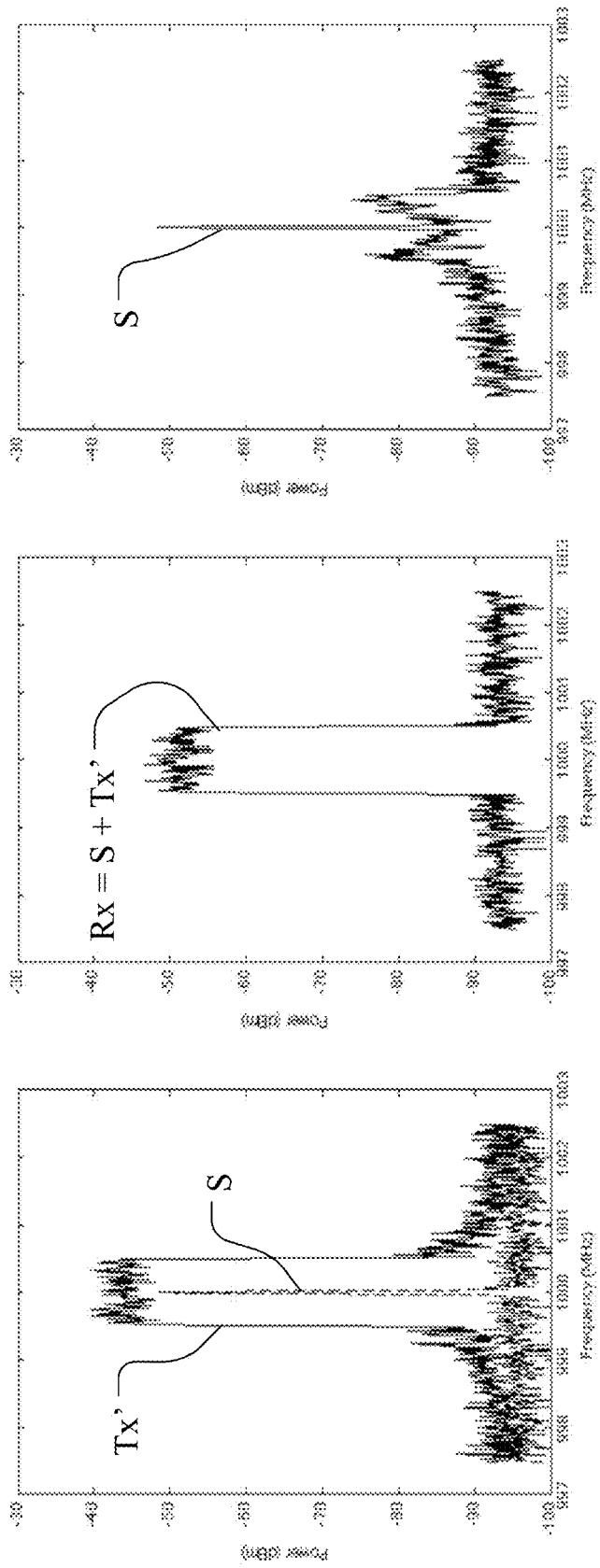

METHODS, SYSTEMS, AND NON-TRANSITORY COMPUTER READABLE MEDIA FOR WIDEBAND FREQUENCY AND BANDWIDTH TUNABLE FILTERING

PRIORITY CLAIM

This application is a continuation-in-part of:

(1) International Patent Application No. PCT/US2011/049399, filed Aug. 26, 2011, which claims the benefit of U.S. Provisional Patent Application Ser. No. 61/402,416, filed Aug. 30, 2010, and U.S. Provisional Patent Application Ser. No. 61/510,330, filed Jul. 21, 2011; and (2) U.S. patent application Ser. No. 13/271,420, filed Oct. 12, 2011, which claims the benefit of U.S. Provisional Patent Application Ser. No. 61/393,157, filed Oct. 14, 2010, and U.S. Provisional Patent Application Ser. No. 61/393,163, filed Oct. 14, 2010;

and is a continuation of International Patent Application No. PCT/US2012/066259, filed Nov. 21, 2012, which claims the benefit of U.S. Provisional Patent Application Ser. No. 61/546,784, filed Oct. 13, 2011, and U.S. Provisional Patent Application Ser. No. 61/719,353, filed Oct. 26, 2012;

the disclosures of which are incorporated herein by reference in their entireties.

TECHNICAL FIELD

The subject matter described herein relates to providing enhanced radio frequency (RF) signals. More particularly, the subject matter described herein relates to methods and systems for wideband frequency and bandwidth tunable filtering.

BACKGROUND

Radio frequency interference (RFI), e.g., from televisions, transmissions at white space frequencies, satellite downlinks at GPS frequencies, self-interference in transceivers or jamming from an adversary, can cause distortion that degrades or disrupts reception of wireless data signals. Conventional methods for reducing or filtering RFI each have distinct disadvantages.

Analog steering of nulls with array antennas is a spatial domain method that minimizes antenna gain in the direction of an interferer to prevent masking by a high power source of interference. Such antennas are, however, bulky and complex. In addition, they require a steering solution, computation of which consumes significant power and time.

Blanking is a time domain method that excises temporal portions of array signals that contain burst interference as a means of avoiding distortion or masking. While blanking mitigates the need for a steering solution, it leaves the receiver blind in the face of continuous interference.

Another problem associated with wireless communications is self-interference. Self-interference is combated various ways, such as by time domain or frequency domain duplexing to prevent high power transmit signals from entering distortion-prone receiver circuits. In either case, separation of the signals reduces the effective carrying capacity of the wireless spectrum.

Digital filtering methods provide a wide array of tools for isolating signals of interest but require conversion of signals to digital form using distortion-prone active circuits. As a result, analog filtering is used to reduce power before a signal is digitized. Circuits using Type III-IV semiconductor materials such as gallium nitride can tolerate higher power levels before reaching saturation and the distortion that saturation causes, but such materials significantly increase cost and complexity, limiting their use primarily to military applications. Consumer products, by contrast, are quite cost sensitive so they are fabricated primarily with CMOS, a low cost but distortion sensitive material. To compensate for such sensitivity, devices typically are operated at reduced power, which degrades efficiency and link margin in general. Providing inexpensive electronic products that operate free of distortion at higher power than currently possible is clearly desirable.

Another conventional approach is to filter an incoming signal to suppress interference at a particular frequency, typically by using a band-stop or "notch" filter to suppress all signals at the particular frequency. While this approach may remove interference that occurs primarily at a particular frequency, herein referred to as "narrowband" interference, it is not well suited to remove interference that occurs across a broad range of frequencies, herein referred to as "wideband" interference. Yet another conventional approach is to combine a set of narrowband filters to remove wideband interference, but the number of filters required makes this approach relatively costly. Another disadvantage to these approaches is that if the interference is at the same frequency as the desired signal, the band-stop filter not only removes the interference but also removes the desired signal as well, which makes recovery of the desired signal that much more difficult.

Accordingly, in light of these disadvantages associated with conventional approaches to distortion filtering, there exists a need for wideband frequency and bandwidth tunable filtering.

SUMMARY

According to one aspect, the subject matter described herein includes a wideband frequency and bandwidth tunable filter that includes a first splitter for receiving a filter input signal and producing a first input signal and a second input signal, a first modifier block for modifying the first input signal to produce a first output signal, an adjustment circuit for modifying the second input signal to produce a second output signal having an intermediate frequency response, a first signal combiner for combining the first output signal and the second output signal to produce a filter output signal, and a compensation device for adjusting at least one of a phase of the first output signal relative to a phase of the second output signal and an amplitude of the first output signal relative to an amplitude of the second output signal such that the filter output signal has a target frequency response. The adjustment circuit includes a second splitter for receiving the second input signal and producing a third input signal and a fourth input signal, a second modifier block for modifying the third input signal to produce a third output signal, a third modifier block for modifying the fourth input signal to produce a fourth output signal, and a second signal combiner for combining the third output signal and the fourth output signal to produce the second output signal having the intermediate frequency response.

As used herein, the term "wideband" has the meaning conventionally used in the art, i.e., "having a frequency bandwidth substantially wider than the signal of interest." For example, the term "wideband noise" refers to noise having a bandwidth substantially wider than the desired signal. For a 24 MHz wide signal of interest, an interfering signal having a bandwidth that is four times wider, e.g., 96 MHz wide, may be considered substantially wider than the signal of interest. For a jamming signal or other signals that may interfere with communications signals, an interfering signal having a bandwidth that is even just 5% wider than the signal of interest may also be considered to be "substantially wider" than the signal of interest.

According to another aspect, the subject matter described herein includes a receiver with a wideband frequency and bandwidth tunable filter. The receiver includes an interface for receiving at least one input signal and a wideband frequency and bandwidth tunable filter for filtering the at least one input signal and producing a filtered output signal having a desired frequency response, the filter including a filter input node for receiving the at least one input signal from the interface. The filter also includes a first signal path for receiving a first filter input signal from the filter input node and producing a first filter output signal, a second signal path for receiving a second filter input signal from the filter input node and producing a second filter output signal, the second signal path including an adjustment circuit for adjusting the frequency spectrum of the second filter input signal to produce the second filter output signal, a conditioning circuit for conditioning at least one of the first filter input signal and the second filter input signal to provide at least one conditioned input signal to the adjustment circuit, a compensation device for adjusting at least one of a phase of the first filter output signal relative to a phase of the second filter output signal and an amplitude of the first filter output signal relative to an amplitude of the second filter output signal, and a signal combiner for combining the first filter output signal with the second filter output signal to produce the filtered output signal having a desired frequency spectrum.

According to yet another aspect, the subject matter described herein includes a method for wideband frequency and bandwidth tunable filtering. The method includes receiving an input signal for which wideband frequency and bandwidth tunable filtering is desired, creating a second input signal having at least one of a desired phase, amplitude, and delay relative to the first input signal, modifying the second input signal to create a modified second input signal having a desired frequency spectrum, where creating the modified second input signal having the desired frequency spectrum includes creating a third input signal having at least one of a desired phase, amplitude, and delay relative to the second input signal, modifying the third input signal to produce a fourth input signal, and combining the second input signal and the fourth input signal to create the modified second input signal having the desired frequency spectrum. The method also includes adjusting at least one of phase, delay, amplitude magnitude, amplitude sign, and frequency spectrum of the modified second input signal with respect to the first input signal, and combining the modified second input signal with the first input signal to create an output signal having the desired frequency response.

The subject matter described herein can be implemented using software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms. Devices embodying the subject matter described herein may be manufactured by any means, such as by semiconductor fabrication or discreet component assembly although other types of manufacturer are also acceptable, and can be manufactured of any material, e.g., CMOS.

BRIEF DESCRIPTION OF THE DRAWINGS

Preferred embodiments of the subject matter described herein will now be explained with reference to the accompanying drawings, wherein like reference numerals represent like parts, of which:

FIG. 8A is a graph showing the frequency components of signals that are being transmitted and received by a transceiver according to an embodiment of the subject matter described herein;

FIG. 8B is a graph showing the frequency components of a raw antenna signal received by a transceiver according to an embodiment of the subject matter described herein;

FIG. 8C is a graph of the received signal that is output by a transceiver according to an embodiment of the subject matter described herein;

DETAILED DESCRIPTION

In accordance with the subject matter disclosed herein, systems, methods, and computer readable media are provided for wideband frequency and bandwidth tunable filtering. Devices and methods for receiving and/or transmitting wireless data or other signals, and/or preventing distortion in active circuits at high power, such as distortion caused by interference from television towers, satellite downlink, electronic attack or self-interference between transmit and receive portions of a transceiver are disclosed. Devices include, but are not limited to, tunable filters, duplexers, amplifiers, receivers, passive channels, transceivers, radios, sensors and navigation devices. Many of the examples described herein relate to wireless data signals. However, the circuits described herein can also be used to reduce distortion in signals transmitted over wired communications media. Also, while many of the examples described herein relate to RF communications, the subject matter described herein can remove distortion at frequencies above and below RF frequencies.

A signal is defined here as comprising at least one content type of: desirably received (S), transmitted (Tx), actually received (Rx), transmission interference (Tx'), distortion, and noise. Full duplex is defined here as sending and receiving of signals at the same time and same frequency, versus traditional time domain or frequency domain methods signal management. Full duplex circuits can also be used to cancel leakage of Tx at a proximate frequency such as in paired channel transceivers. The invention disclosed herein is intended for practice as part of any device subject to distortion at high power.

Reference will now be made in detail to exemplary embodiments of the present invention, examples of which are illustrated in the accompanying drawings. Wherever possible, the same reference numbers will be used throughout the drawings to refer to the same or like parts.

Figure 1:
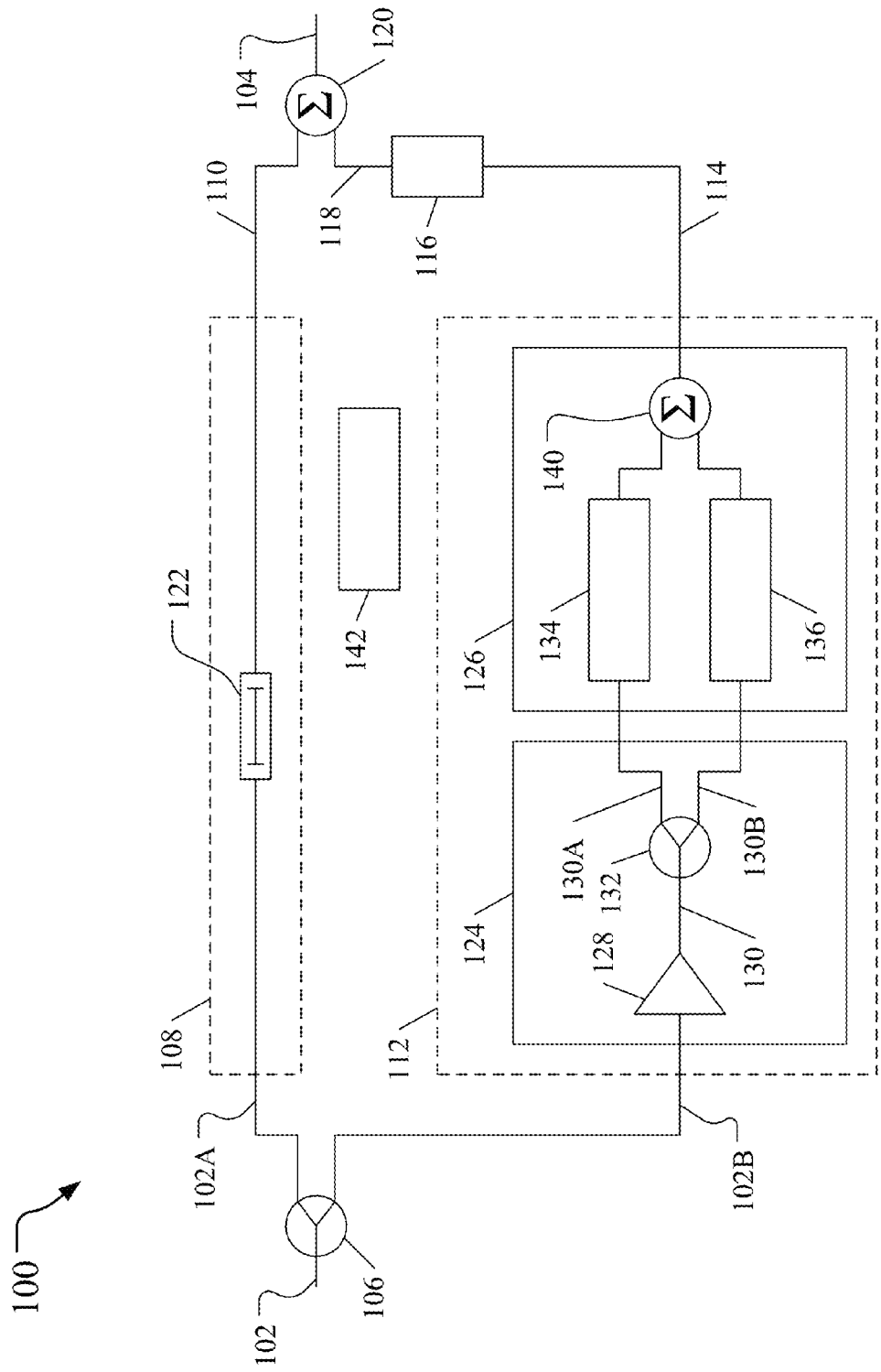
FIG. 1 is a block diagram illustrating an exemplary wideband frequency and bandwidth tunable filter according to an embodiment of the subject matter described herein.

FIG. 1 is a block diagram illustrating an exemplary wideband frequency and bandwidth tunable filter according to an embodiment of the subject matter described herein. In the embodiment illustrated in FIG. 1, filter 100 includes at least one input node 102 and at least one output node 104. As used herein, the signal present at input node 102 may be synonymously referred to as input signal 102, and the signal present at output node 104 may be synonymously referred to as output signal 104. As will be described in more detail below, filter 100 may operate in a number of modes, including but not limited to bandpass, null bandpass, notch, bandstop, and others.

In one embodiment, filter 100 may include a first splitter 106 for splitting a signal present at input node 102 into a first input signal 102A and a second input signal 102B. In one embodiment, first splitter 106 may produce signals that are substantially 180 degrees out of phase with each other. Such a splitter is commonly referred to as a "0/180" splitter to indicate the one output is 180 degrees out of phase with the other output. In an alternative embodiment, first splitter 106 may produce signals that are substantially in phase with each other. Such a splitter is commonly referred to as a "0/0" splitter to indicate that one output is 0 degrees out of phase with the other output. First splitter 106 may produce output signals that have other phase differences, such as 90 degrees (i.e., a "0/90" splitter), 45 degrees (i.e., a "0/45" splitter), etc. In one embodiment, first splitter 106 may be controllable to adjust the relative phase of its output signals, i.e., a "0/N" splitter, where N is a number adjustable between 0 and 360 degrees and fractions thereof. In an alternative embodiment, the relative phases of the outputs of first splitter 106 may be fixed, e.g., non-controllable or non-adjustable. In one embodiment, input signals 102A and 102B are correlated. The present disclosure is described in terms of two signals but is intended to cover any plurality of signals. A split signal may be produced by a splitter of any type, including, but not limited to, a power divider, a signal splitter, a balun, and other types.

First input signal 102A is provided to a first signal path 108, which produces a first output signal 110, and second input signal 102B is provided to a second signal path 112, which produces a second output signal 114. In one embodiment, filter 100 includes a first compensation device 116 for adjusting the phase and/or amplitude of first output signal 110 relative to the phase and/or amplitude second output signal 114 to produce compensated second output signal 118. First output signal 110 and compensated second output signal 118 are combined by a combining circuit 120 to produce the filter output signal present at output node 104, this output signal having the desired frequency spectrum. In one embodiment, combining circuit 120 may be, but is not limited to, a summing circuit. Combining circuit 120 may be any type that can combine multiple input signals to provide a combined output signal.

In one embodiment, first signal path 108 may include a delay device 122 for modifying temporal delay of first input signal 102A along first signal path 108. In one embodiment, first signal path 108 may include an attenuator, amplifier, or other type of gain control.

In one embodiment, second signal path 112 may include a conditioner, such as preamplifier 124, for conditioning or pre-compensating second input signal 102B and sending the conditioned signal to an adjustment circuit 126 for producing second output signal 114 having a desired frequency spectrum.

In one embodiment, preamplifier 124 may be any type that can provide one or more saturating or limiting type signals, defined as any signal that can at least partly impede or prevent further distortion as a means of providing a distortion free output signal of any type, such as passband type. In the embodiment illustrated in FIG. 1, for example, preamplifier 124 may include a circuit 128 that can produce a pre-saturated signal 130 that is an at least partially saturated second input signal 102B. In one embodiment, circuit 128 may be a preamplifier for adjusting the gain of second input signal 102B. In one embodiment, circuit 128 may amplify second input signal 102B so that it saturates, clips or distorts, producing additional high-frequency components. Pre-saturated signal 130 may be hard-limited, partially or partly limited, and/or non-linear although this is not required. In one embodiment, preamplifier 124 may be any device that can provide a limiting type of signal. In one embodiment, preamplifier 124 may be any type that can provide a signal having distortion of any type, such as at least partly limiting, hard limiting, clipping, inter-modulated, harmonic and at least partly saturated. In one embodiment, pre-saturated signal 130 may be considered to be pre-distorted, in that preamplifier 124 may introduce so much distortion that the downstream devices cannot introduce any further distortion. Pre-saturated signal 130 may also be referred to as a limiting signal, in that it is subsequently combined with another signal in a manner that limits the other signal, as will be discussed in more detail below.

In one embodiment, preamplifier 124 may include a second splitter 132 for splitting pre-saturated signal 130 into limiting signals 130A and 130B, which are sent to adjustment circuit 126. Like first splitter 106, second splitter 132 may produce outputs that are in phase with each other or out of phase with each other, and the relative phases may likewise be fixed or adjustable. Furthermore, limiting signals 130A and 130B may be in phase, out of phase, inverted, shifted, amplified, attenuated, or identical with respect to each other. In one embodiment, second splitter 132 may be controllable to vary the characteristics of one limiting signal relative to the other limiting signal.

In one embodiment, adjustment circuit 126 may contain multiple modifier blocks that modify an input signal to produce a modified output signal. Adjustment circuit 126, and, by extension, filter 100 may perform filtering without using inductors or capacitors. In the embodiment illustrated in FIG. 1, for example, adjustment circuit 126 includes a first modifier block 134 having an input connected to limiting signal 130A and a second modifier block 136 having an input connected to limiting signal 130B.

One or both of modifier blocks 134 and 136 may include circuits or devices to perform one or more modifications to the modifier block's input signal to produce a modified output signal, including, but not limited to, an amplifier, an active inductor, a capacitor, a varactor, a vector modulator, and a tunable phase shifter. Example modifications include, but are not limited to, modification of amplitude magnitude, amplitude sign, phase, delay, impedance, and frequency spectrum of the input signal with respect to at least one frequency. Each modifier block may include a sensing means for sensing at least one signal characteristic, such as amplitude, phase shift, delay, spectrum, impedance, or other of input and/or output signals. Adjustment circuit 126 may be open loop or feedback controlled. Adjustment circuit 126 may provide antenna impedance matching.

In one embodiment, the outputs of modifier blocks 134 and 136 are combined to produce second output signal 114. In the embodiment illustrated in FIG. 1, for example, the outputs of modifier blocks 134 and 136 are connected to a second signal combiner 140. In one embodiment, second signal combiner 140 may be a summing device, such as a summing amplifier, but other types of combining devices may be used.

In one embodiment, adjustment circuit 126 may be any type of device that can restore a wireless data signal by removing saturation that was introduced by preamplifier 124 as a means of preventing distortion during modification of an input signal 102 and thereby provide an output signal 104 comprising a passband that is substantially free of interference and/or distortion ("distortion free passband signal"). In one embodiment, adjustment circuit 126 may be any type of device that can combine a plurality of signals, such as channel signals, to at least partly reduce at least one content type, e.g., limiting signal, interference, noise, Tx, S, J, and Rx, of input signal.

In one embodiment, compensation device 116 adjusts the phase and/or amplitude of second output signal 114 to produce compensated second output signal 118, but in alternative embodiments, first output signal 110 may be compensated, or both first output signal 110 and second output signal 114 may be compensated. In one embodiment, compensation device 118 may adjust the phase of first output signal 110 relative to the phase of second output signal 114 according to a feed-forward method. For example, compensation device 118 may use a deterministic algorithm to calculate the proper phase relationship of first output signal 110 and second output signal 114.

In one embodiment, compensation device 116 may determine amplitude and/or phase modification by a non-analytic method, such as gradient or statistical minimization. In another embodiment, an analytic method and non-analytic method can be practiced sequentially to provide a tuned solution. In one embodiment, the adjustment of the phase of second output signal 114 may be calculated analytically to minimize the amplitude (β) of combined output signal 104 according to equation 1;

$$\alpha(\omega t+\phi_1)+\alpha(\omega t+\phi_2+\delta\phi)=\beta(\omega t) \qquad (1)$$

where α is the amplitude of first output signal 110, e.g. using equation 2;

$$\delta\phi=n\pi arcos(\beta/2\alpha) \qquad (2)$$

with an optional second step of test phase shifting using a different test shift, e.g. 45 degrees, to resolve the ± ambiguity in equation 2.

For example, compensation device 116 may determine a first measured amplitude (α) of first output signal 110, and then perform a test phase shift, i.e., by introducing a trial amount of phase shift $\phi_t$ into second output signal 114, and then measuring the amplitude (β) of filter output signal 104. The amount of phase shift introduced may be any amount, including zero phase shift. Compensation device 116 may then calculate the correct phase shift $\phi_f$ to apply to second output signal 114 according to equations 1 and 2, above. This will cause the second output signal 114 to be anti-phase with first output signal 110 as desired.

The advantage of calculation of a target phase shift according to the equation above is that this method is deterministic, requiring little computation, and produces a phase shift value within a known amount of time, as opposed to computationally demanding statistical methods of steering array signals or by searching by trial and error. Another advantage to this approach is that it allows compensation device 116 to adjust quickly to changing conditions, such as can occur during communication between two moving entities, or where a first source of interference is superseded by a second source of interference, e.g., cooperating jamming sources. It will be understood by one of skill in the art that the deterministic methods described with respect to compensation device 116 may also be employed by other components within filter 100, such as modifier blocks 134 and 136.

In one embodiment, filter 100 may include circuitry to control operation of the various components. In the embodiment illustrated in FIG. 1, filter 100 includes a controller 142. Examples of controller 142 include but are not limited to a microcontroller or microprocessor, an application specific integrated circuit (ASIC), a field-programmable gate array (FPGA), dedicated analog and/or digital circuitry, or other means. In the embodiment illustrated in FIG. 1, for example, controller 142 may control the relative phases of the signals output by first splitter 106, the operation of compensation device 116, the operation of first signal combining device 120, the delay imposed by first delay device 122, the operation of circuit 128, the relative phases of the signals output by second splitter 132, the operations performed by modifier blocks 134 and/or 136, and the operation of second signal combiner 140. In the embodiment illustrated in FIG. 1, filter 100 includes one control circuit, controller 142, but other embodiments include multiple controllers or no controllers.

In one embodiment, first signal path 108 or second signal path 112 may be deactivated. For example, filter 100 may be in-line within a signal path of a larger device, where the larger device may determine that filter 100 is not required. In this circumstance, the larger device may deactivate (or instruct controller 142 to deactivate, if controller 142 is extant) second signal path 112 and set first delay device 122 to impose zero delay on the first signal path, and by so doing cause filter 100 to simply pass the signal without filtering. For example, filter 100 may disconnect second signal path 112 from first combining circuit or filter output 104 via a transmission gate, transistor, switch, relay, or other means. Alternatively, second signal path 112 may instead be configured as an all pass filter. Later, filter 100 may be instructed to begin or resume filtering, at which time second signal path 112 may be activated to perform the desired filtering operation.

In one embodiment, filter 100 may be any device that can modify and/or combine one or more channel signal with each other and/or a passive channel signal to provide an output signal having one or more frequency component which is substantially free of distortion, substantially free of interference, and/or having attenuated ("null") amplitude. In one embodiment, filter 100 may be any type that can modify a signal, e.g., first channel signal and/or second channel signal, according to the method described in commonly assigned, co-pending international patent application number PCT/US11/49399, the disclosure of which is incorporated herein in its entirety. An example operation of filter 100 is now presented.

Figure 2A:
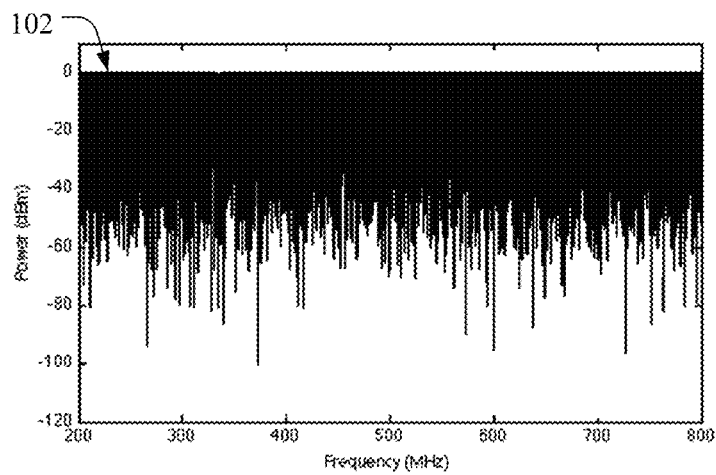
FIG. 2A is a graph showing the frequency components of an exemplary input signal that is applied to an exemplary wideband frequency and bandwidth tunable filter according to an embodiment of the subject matter described herein.

FIG. 2A is a graph showing the frequency spectrum of a saturated Gaussian wideband noise input signal such as can be applied to filter input 102 or applied to adjustment circuit 126 Referring again to the embodiment of adjustment circuit 126 illustrated in FIG. 1, circuit 128 may be an amplifier that produces a fully or partially saturated signal 130, which is split by splitter 132 and fed into modifier blocks 134 and 136. In one embodiment, modifier block 134 may impose a desired delay and/or phase shift of signal 130A relative to signal 130B, while modifier block 136 may modify the amplitude of signal 130B to match amplitude of output from modifier block 134. In one embodiment, the delay imposed by first delay device 122 on signals traveling along first signal path 108 may be adjusted to provide a desirable difference in delay or delay matching relative to the signal traveling along second signal path 112.

In one embodiment, the delay and/or phase change that is imposed by modifier block 134 may be adjusted so as to cause a cancellation around a chosen frequency due to destructive interference when the outputs from modifier blocks 134 and 136 are summed at combining device 140. In this manner, the destructive interference at the chosen frequency range causes the frequency response of adjustment circuit 126 to look like the waveform shown in FIG. 2B. For example, the change in phase or amplitude imposed by modifier block 134 may be used to adjust the center frequency of the null passband, while the delay imposed by modifier block 136 may be used to adjust the bandwidth of the null passband, which is a function of group delay: a large group delay creates a narrow passband, and a small group delay creates a large passband.

Figure 2B:
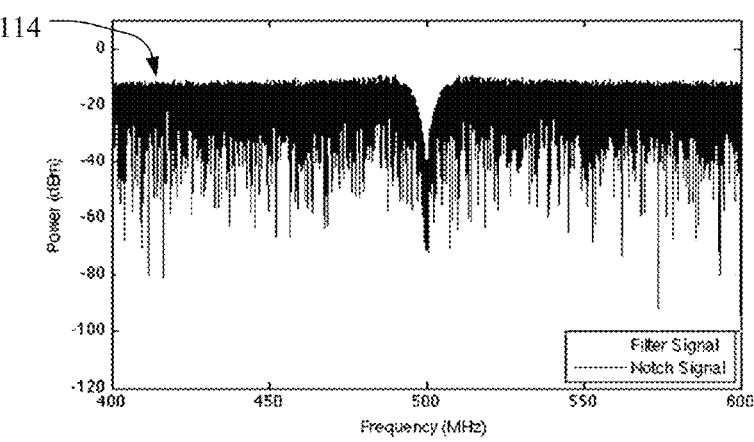
FIG. 2B is a graph showing the frequency response of an adjustment circuit component within according to an embodiment of an exemplary wideband frequency and bandwidth tunable filter according to an embodiment of the subject matter described herein.

FIG. 2B is a graph showing the frequency response of an exemplary adjustment circuit 126 according to an embodiment of the subject matter described herein, such as second output signal 114 in FIG. 1. In the embodiment illustrated in FIG. 2B, it can be seen that the frequency response of adjustment circuit 126 shows an approximate 20 dB reduction in power at a desired center frequency of 440 MHz. In this embodiment, adjustment circuit 126 operates as a null passband, or "notch" filter having substantially null power at multiple frequencies proximate to a desired center frequency. Both the center frequency and the bandwidth of the null passband may be controlled by operation of the modifier blocks 134 and 136, e.g., by proper selection of modification of phase, delay, amplification, and so on of the output signals that are combined at combining device 140.

In the embodiment now being described, it is desired that filter 100 operate as a passband filter. Thus, the second output signal 114 is desirably adjusted to be 180 degrees out of phase ("anti-phase") with first output signal 110 to optimize destructive interference of signals 110 and 114 at out of band frequencies while retaining the in-band frequency components provided by 110 when 110 and 114 are combined by 120, resulting in the filter output 104 depicted in FIG. 2C.

Figure 2C:
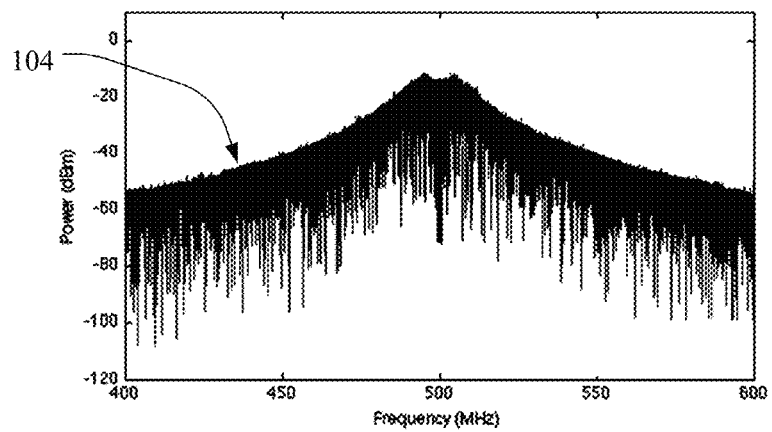
FIG. 2C is a graph showing the frequency response of an exemplary wideband frequency and bandwidth tunable filter according to an embodiment of the subject matter described herein.

FIG. 2C is a graph showing the frequency response of an exemplary filter 100 according to an embodiment of the subject matter described herein. It can be seen that frequencies within the notch of FIG. 2B are not attenuated when compared to the original signal shown in FIG. 2A, while frequencies outside the notch of FIG. 2C have been attenuated due to destructive interference with the corresponding frequencies of second output signal 114 as shown in FIG. 2C. As stated above, when operating as a passband filter, compensation device 116 adjusts the relative phases of first output signal 110 and second output signal 114 so that the two signals are anti-phase with each other at the notch frequency by the time they reach first signal combining device 126. In other filter configurations, it may be desirable for output signals 110 and 114 to be in phase with each other or in some relationship other than exactly anti-phase with each other. These phase relationships can also be created by compensation device 116. In addition, compensation device 116 may also modify amplitude, delay, or other signal characteristics.

Filter 100 may include multiple instances of adjustment circuit 126, and these instances may operate in series, parallel, a combination of series and parallel, or any other configuration to produce a desired filter response. For example, connecting multiple filters 100 or adjustment circuits 126 in series allows for the creation of a filter with a tall and narrow passband, while connecting multiple filters 100 or adjustment circuits 126 in parallel allows for the creation of a filter with a broad and very flat passband. Multiple instances of filter 100 or adjustment circuit 126 may be likewise connected in series, parallel, a combination of series and parallel, or any other configuration to produce a desired filter response.

Figure 3:
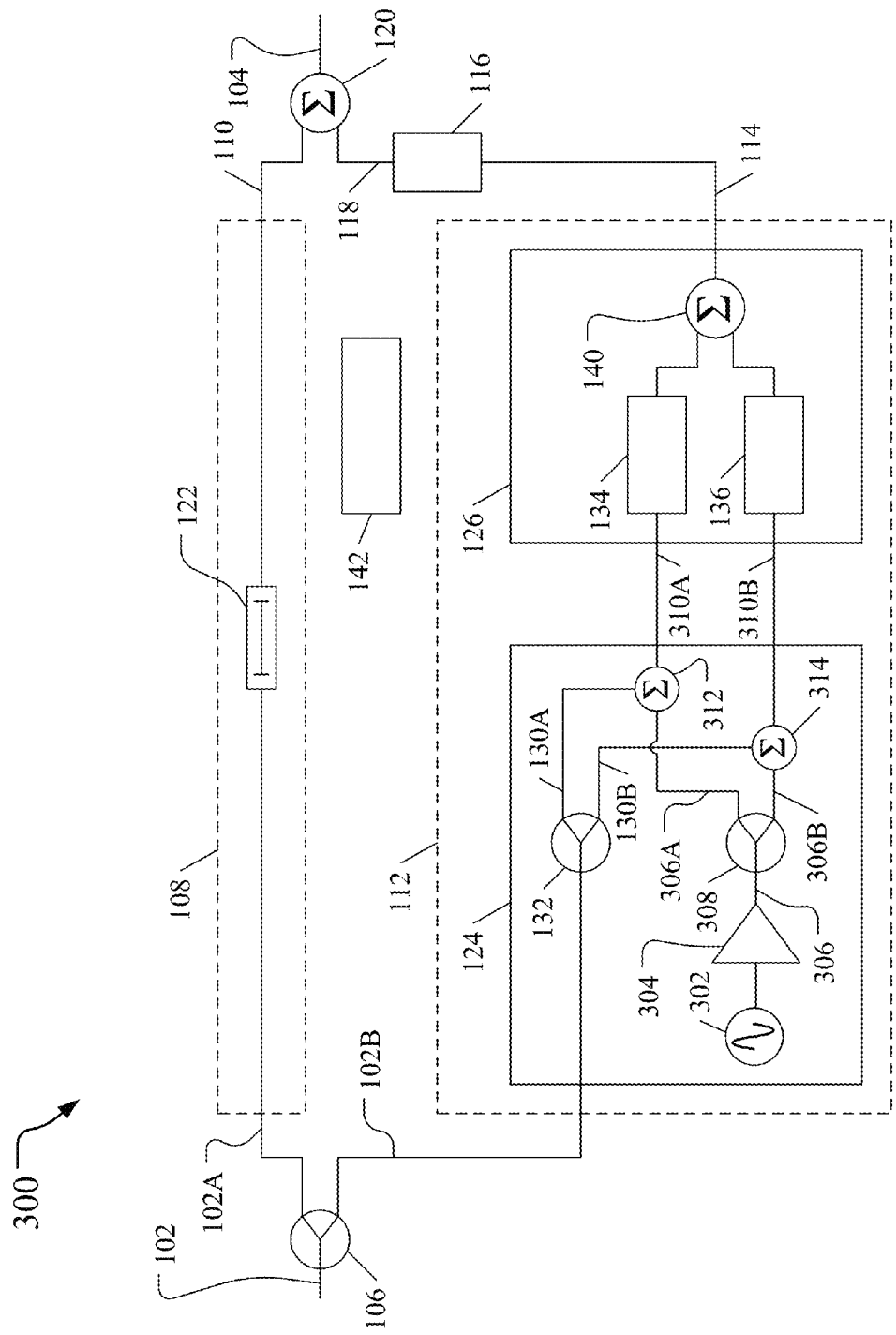
FIG. 3 is a block diagram illustrating an exemplary wideband frequency and bandwidth tunable filter according to another embodiment of the subject matter described herein.

FIG. 3 is a block diagram illustrating an exemplary wideband frequency and bandwidth tunable filter 300 according to another embodiment of the subject matter described herein. Filter 300 is a variation of filter 100 which uses a signal source to create a limiting signal. In the embodiment illustrated in FIG. 3, filter 300 includes a first input signal 102, a filter output signal 104, a splitter 106, a first signal path 108, a first output signal 110, a second signal path 112, a second output signal 114, a compensation device 116, a compensated second output signal 118, a first signal combiner 120, a first delay device 122, a preamplifier 124, a adjustment circuit 126, a second splitter 132, modifier blocks 134 and 136, a second signal combiner 140, and a controller 142, which are substantially equivalent to their like-numbered elements illustrated in FIG. 1, and therefore their descriptions are not repeated here.

In the embodiment illustrated in FIG. 3, preamplifier 124 includes a signal source 302 for providing a signal to a preamplifier 304 to produce an at least partially saturated signal 306, which is split by a third splitter 308 to produce limiting signals 306A and 306B having a desired phase relationship with respect to each other, e.g., in phase, out of phase, antiphase, etc. Signal 306A is combined with signal 130A to produce signal 310A, and signal 306B is combined with signal 130B to produce signal 310B. Signals 310A and 310B are inputs into adjustment circuit 126. In the embodiment illustrated in FIG. 3, summing circuits 312 and 314 are used to combine the signals to create signals 310A and 310B, respectively, but other circuits or methods of combining the signals may be used.

In one embodiment, the operation of preamplifier 124 may be as follows: the signal produced by signal generator 302 may be any type of signal, including periodic signals from simple sine waves to complex waveforms, tones, and multi-tones, or chaotic signals, such as white noise, pink noise, etc. Device 304 may perform as described above to produce signal 306, e.g., device 304 may be an amplifier, limiter, etc. In one embodiment, signal 306 may have a wide frequency spectrum. When the second input signal 102B is split by first splitter 106 and summed with the split pre-compensated signals 306A and 306B, the resulting signals 310 and 310B also have correspondingly wide frequency spectrums. In the embodiment illustrated in FIG. 3, signal 310A is an input signal into modifier block 134 and signal 310B is an input signal into modifier block 136. The outputs of modifier blocks 134 and 136 are combined to produce second output signal 114. In one embodiment, the outputs of modifier blocks 134 and 136 may be combined using a summing circuit 140, but other circuits or methods of combining these signals may be used. In one embodiment, compensation device 116 may operate as described above, and therefore the description will not be repeated here.

In one embodiment, adjustment circuit 126 may operate as described above to produce a signal with a frequency spectrum having a null passband or notch at a target frequency. In one embodiment, the target frequency, the width of the notch, or both may be adjusted by appropriate selection of various parameters of second path 112, including but not limited to, adjusting the frequency, frequency components, and/or shape of the signal produced by signal generator 302, as well as operations performed by modifier blocks 134 and 136. An example of the performance of filter 300 is illustrated in FIGS. 4A-C.

Figure 4C:
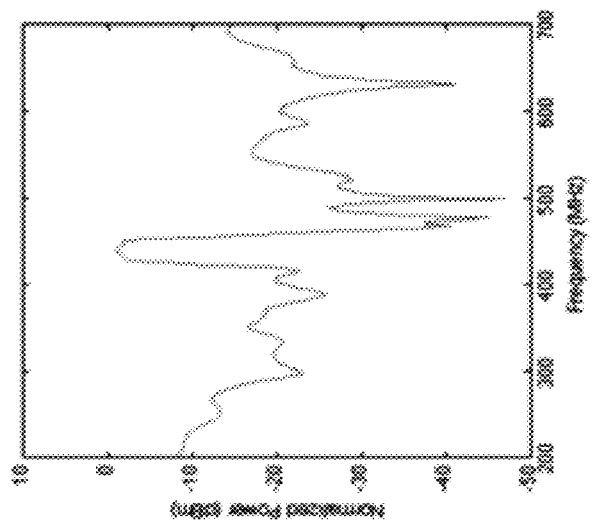
FIG. 4C is a graph showing the frequency response of an exemplary wideband frequency and bandwidth tunable filter according to an embodiment of the subject matter described herein.
Figure 4B:
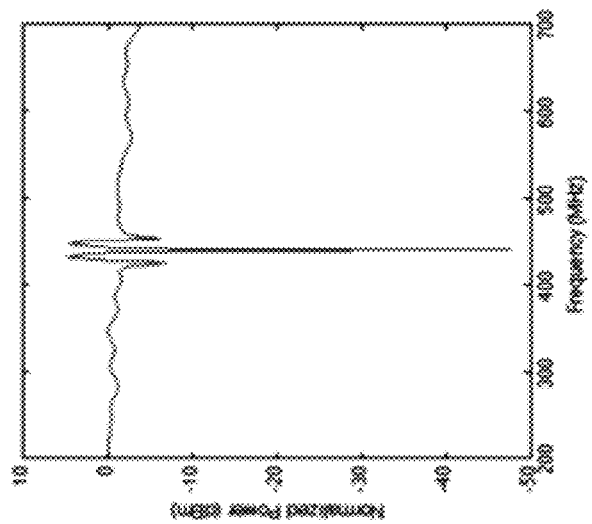
FIG. 4B is a graph showing the frequency response of an adjustment circuit component within an embodiment of an exemplary wideband frequency and bandwidth tunable filter according to an embodiment of the subject matter described herein.
Figure 4A:
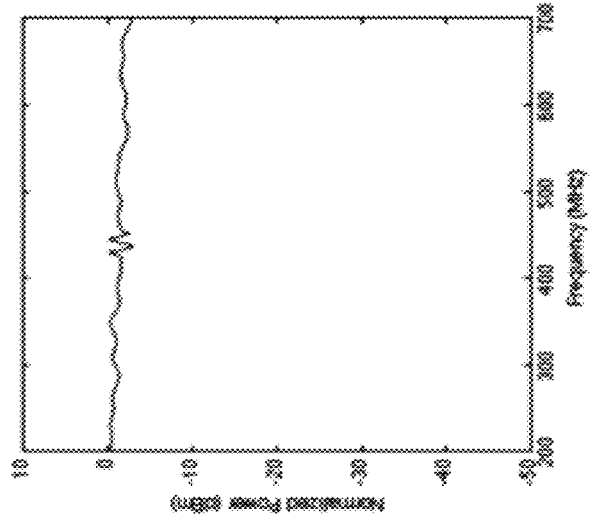
FIG. 4A is a graph showing the frequency components of an exemplary output of signal generator component within according to an embodiment of an exemplary wideband frequency and bandwidth tunable filter according to an embodiment of the subject matter described herein.

FIG. 4A is a graph showing the frequency components of a signal that is provided to filter input 102. In the embodiment illustrated in FIG. 4A, this signal contains frequency components from 200 MHz to 700 MHz.

FIG. 4B is a graph showing the frequency response of adjustment circuit 126. In the embodiment illustrated in FIG. 4B, adjustment circuit 126 has been configured by selecting group delay to create a relatively narrow null passband centered around 450 MHz. Thus, FIG. 4B shows the frequency components of second output signal 114.

FIG. 4C is a graph showing the frequency response of filter 300. In the embodiment illustrated in FIG. 4C, compensation device 116 has adjusted the phase of second output signal 114 so that it is anti-phase with first output signal 110 at the center frequency of 450 MHz. As a result, signals at frequencies other than the center frequency are cancelled, leaving the prominent peak at 450 MHz while other frequencies on either side of that peak show significant reduction, ranging from −20 dBm to −30 dBm.

The ultrawideband frequency and bandwidth tunable filters described herein have a wide range of application. A few of these will now be described.

Figure 5:
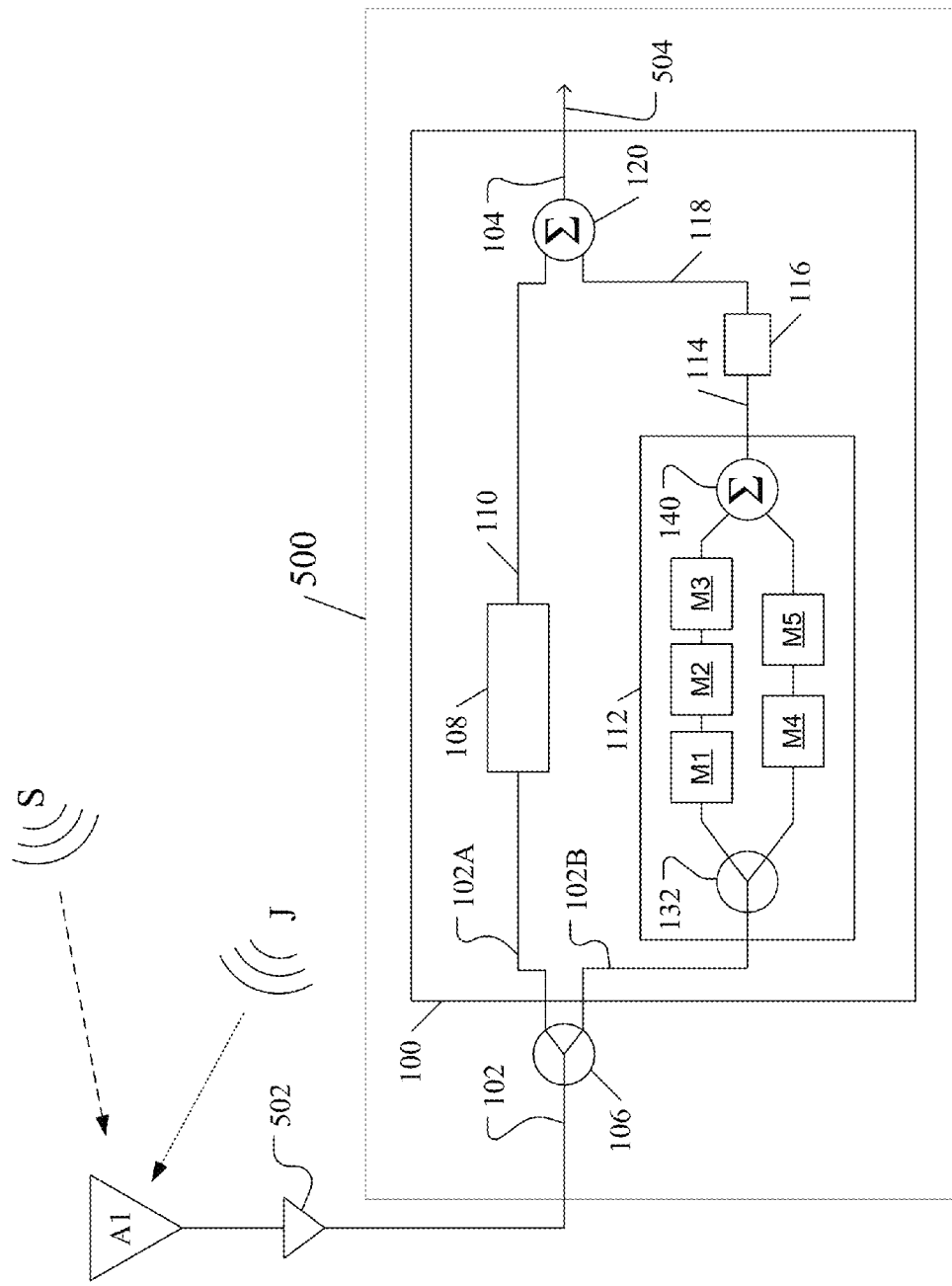
FIG. 5 is a circuit diagram illustrating an exemplary receiver with a wideband frequency and bandwidth tunable filter according an embodiment of the subject matter described herein.

FIG. 5 is a circuit diagram illustrating an exemplary receiver with a wideband frequency and bandwidth tunable filter according an embodiment of the subject matter described herein. In the embodiment illustrated in FIG. 5, a receiver 500 is connected to a first antenna A1 through an antenna preamplifier 502, which feeds the amplified antenna signal to a wideband frequency and bandwidth tunable filter 100 such as the filter illustrated in FIG. 1 to produce a filtered signal 504, which may be passed to downstream receiver circuitry, which is omitted from FIG. 5 for clarity. FIG. 5 illustrates a bandpass filter embodiment for tunably reducing out of band power of a signal of high power, e.g., due to adversarial jamming, enabling linear operation of subsequent circuitry, e.g., receiver module.

In the example illustrated in FIG. 5, a transmitter S generates a radio frequency signal, which is received by receiver 500. In one embodiment, there may be one or more sources of RF noise or interference, shown in FIG. 5 as jammer transmitter J, which may be a source of unintended noise or a source of interference deliberately intended to "jam" or prevent the reception of S by receiver 500 or intended to trick receiver 500 into mistaking the jammer transmission for the real signal. For simplicity of explanation, the term "S" will be used to mean either the transmitter of a desired signal or the desired signal itself, depending on the context. Likewise, the term "J" will be used to mean either the source of an undesired signal or the undesired signal itself, depending on the context.

If interfering signal J is wideband noise outside of the frequency range of the desired transmission S, the operation of filter 100 as described for FIG. 1 will suppress frequencies other than the target frequency, including J. Even in the case of a deliberate jamming of the target frequency, filter 100 is beneficial because, by attenuating signals at frequencies outside of the target frequency, the filtered signal 504 will have significantly reduced power, making it less likely to saturate the downstream receiver components and thus less likely to introduce additional distortion into the received signal caused by active components in the receiver.

In the embodiment illustrated in FIG. 5, filter 100 includes a first input signal 102, a filter output signal 104, a splitter 106, a first signal path 108, a first output signal 110, a second signal path 112, a second output signal 114, a compensation device 116, a compensated second output signal 118, a first signal combiner 120, a second splitter 132, and a second signal combiner 140, which are substantially equivalent to their like-numbered elements illustrated in FIG. 1, and therefore their descriptions are not repeated here.

In the embodiment illustrated in FIG. 5, second signal path 112 includes several modifier blocks M1, M2, M3, M4, and M5, where modifier blocks M1 through M3 are connected in series, modifier blocks M4 and M5 are connected in series, and the two groups are connected in parallel. Each modifier block may modify at least one of amplitude magnitude, amplitude sign, phase, delay, impedance, and frequency spectrum of the input signal with respect to at least one frequency. Each modifier block may include a sensing means for sensing at least one signal characteristic, such as amplitude, phase shift, delay, spectrum, impedance, or other of input and/or output signals. This illustrates the principle that modifier blocks may be connected in various topologies as appropriate to the task. In one embodiment, the connection topology of the modifier blocks may be controllable, e.g., via a crossbar bus, point-to-point connections, selectable datapaths, etc.

Figure 6A:
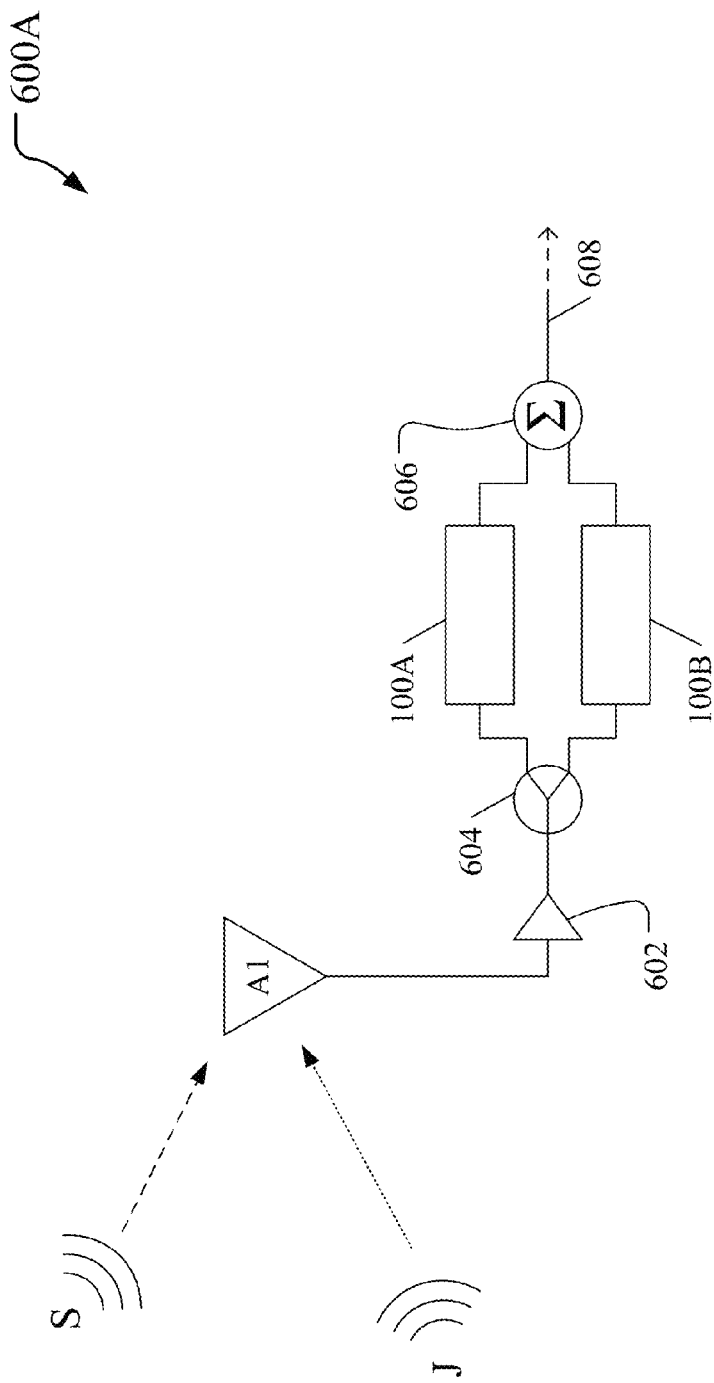
FIG. 6A is a circuit diagram illustrating an exemplary receiver with a wideband frequency and bandwidth tunable filter according another embodiment of the subject matter described herein.
Figure 6B:
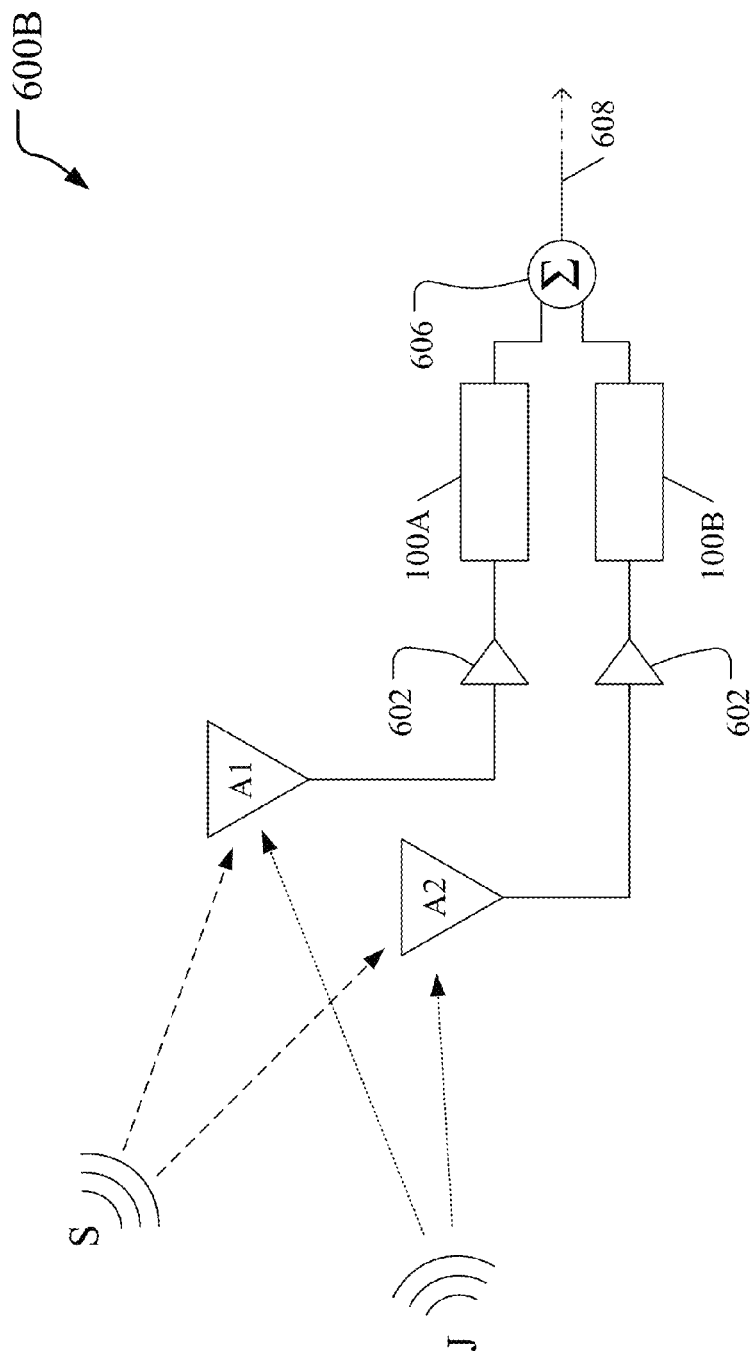
FIG. 6B is a circuit diagram illustrating an exemplary receiver with a wideband frequency and bandwidth tunable filter according another embodiment of the subject matter described herein.

FIGS. 6A and 6B illustrate other receivers with wideband frequency and bandwidth tunable filters according to embodiments of the subject matter described herein.

FIG. 6A is a circuit diagram illustrating an exemplary receiver with a wideband frequency and bandwidth tunable filter according another embodiment of the subject matter described herein. In the embodiment illustrated in FIG. 6A, a receiver 600A includes a first antenna A1 that is connected to an antenna preamplifier 502, which feeds the amplified antenna signal to a splitter 604. Each output of the splitter 604 is sent to a separate wideband frequency and bandwidth tunable filter, shown in FIG. 6A as filters 100A and 100B. Each of the filters 100A and 100B perform some type of filtering, and in the embodiment illustrated in FIG. 6A, the outputs of the two filters are combined, such as using a summing circuit 606, to produce a filtered signal 608, which is sent to downstream transceiver circuitry, which is omitted from FIG. 6A for clarity.

In the example illustrated in FIG. 6A, a transmitter S generates a radio frequency signal, which is received by receiver 600A. As described above with relation to FIG. 5, there may be one or more sources of RF noise or interference, shown in FIG. 6A as jammer transmitter J. In the embodiment illustrated in FIG. 6A, two wideband frequency and bandwidth tunable filters 100A and 100B are configured in parallel, but other configurations are contemplated, including using more than two instances of filter 100, wiring two or more filters in series, etc. In one embodiment, the filters may be configured to operate at different frequencies, which may be useful for diversity receivers, frequency-hopping receivers, parallel multi-frequency applications, and other applications where multiple frequencies may be used.

FIG. 6B is a circuit diagram illustrating an exemplary receiver with a wideband frequency and bandwidth tunable filter according another embodiment of the subject matter described herein. In the embodiment illustrated in FIG. 6B, a receiver 600B includes a first filter 100A connected to a first antenna A1 and a second filter 100B connected to a second antenna A2 as means of providing an output signal 610 substantially free of distortion and of interference at passband frequencies. In one embodiment, receiver 600B may include preamplifiers 602 between each antenna and its respective filter. Each of the filters 100A and 100B perform some type of filtering, and in the embodiment illustrated in FIG. 6B, the outputs of the two filters are combined, such as using a summing circuit 606, to produce a filtered signal 608, which is sent to downstream transceiver circuitry, which is omitted from FIG. 6B for clarity. The receiver 600B embodiment in FIG. 6B illustrates the principle that wideband frequency and bandwidth tunable filters 100A and 100B have application in multi-antenna systems, including diversity systems and systems having antenna arrays. In one embodiment, the wideband frequency and bandwidth tunable filters 100A and 100B may be used in conjunction with phased arrays, beam steering, and other techniques used with multiple antenna or antenna array configurations, since these techniques are complementary. The wideband frequency and bandwidth tunable filters disclosed herein are particularly suited for use to reduce jamming or other interference in global positioning system (GPS) receivers.

The wideband frequency and bandwidth tunable filters disclosed herein are well suited for transceivers, as well. For example, a tunable filter may be used to clean up received data by removing reflected transmitted data from the received signal. This is described in more detail in FIGS. 7A through 7D, below.

FIGS. 7A through 7D are circuit diagrams illustrating exemplary transceivers with a wideband frequency and bandwidth tunable filter according other embodiments of the subject matter described herein. Example transceivers include but are not limited to wireless handsets, base stations, multiband radios, radar, and others, and may use fixed or tunable frequencies.

Figure 7A:
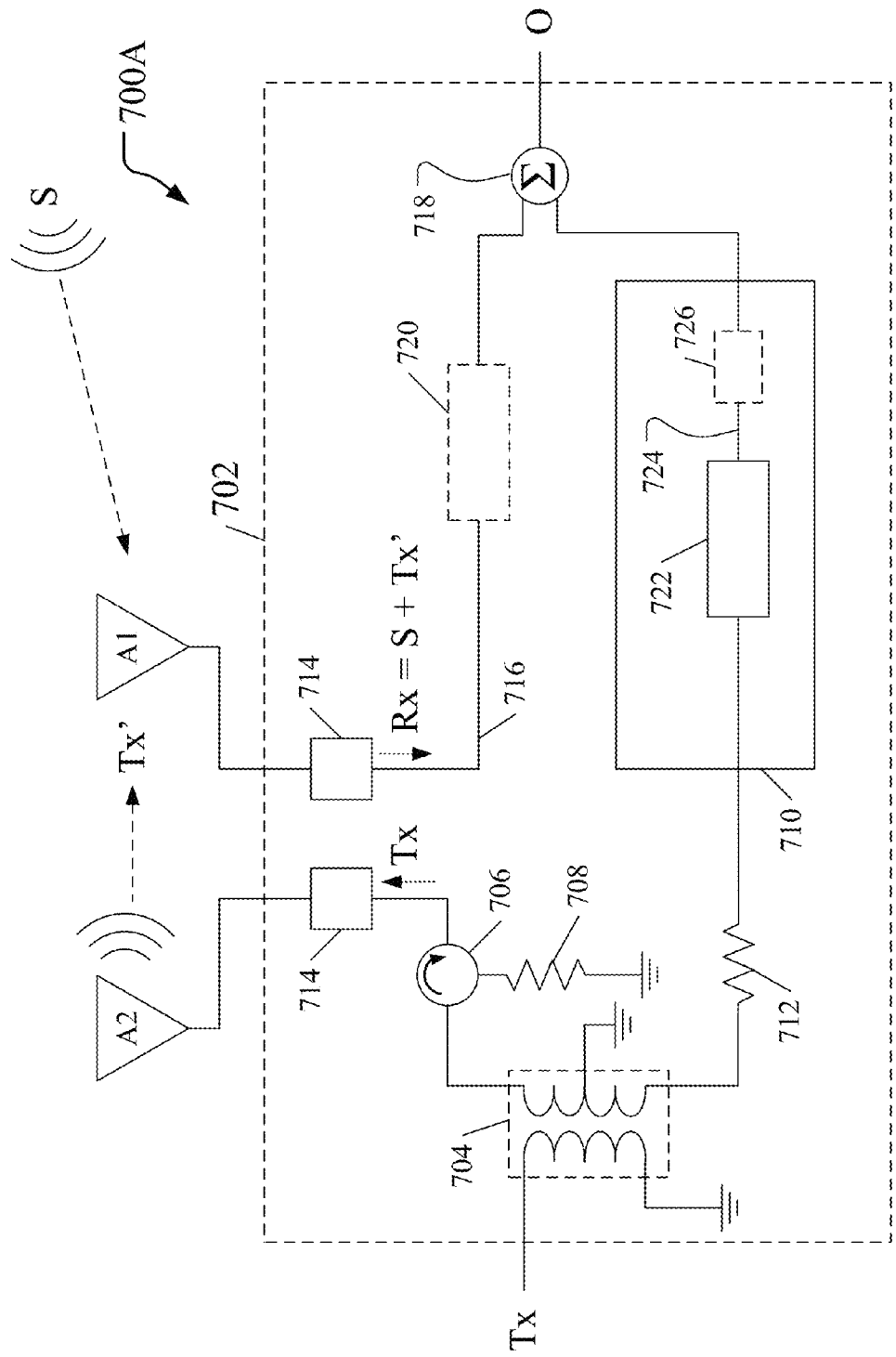
FIGS. 7A-7D are circuit diagrams illustrating an exemplary transceiver with a wideband frequency and bandwidth tunable filter according to embodiments of the subject matter described herein.

FIG. 7A is a circuit diagram illustrating an exemplary transceiver with a wideband frequency and bandwidth tunable filter according to one embodiment of the subject matter described herein. In the embodiment illustrated in FIG. 7A, a transceiver 700A includes a first antenna A1 for receiving data, a second antenna A2 for transmitting data, and a wideband frequency and bandwidth tunable filter 702. Data be transmitted Tx is provided to, and transmitted by, antenna A2. Antenna A1 receives the desired signal S, but may also receive cosite interference Tx' from antenna A2. It is therefore desired that filter 702 will remove the Tx' data from the received data Rx, which contains both S and Tx', to produce an output signal O that contains S but little or no Tx'.

Within the transceiver, transmit data Tx is also provided to filter 702. A first splitter 704, which in the embodiment illustrated in FIG. 7A is a transformer, splits the Tx signal. One copy of the signal is sent to antenna A2 via a direction limiting component 706 and associated impedance 708. Another copy of the signal is sent to a adjustment circuit 710. In the embodiment illustrated in FIG. 7A, the second copy of the signal goes through a resistor 712 or other impedance, which attenuates the second copy of the signal to match the loss of gain suffered by the first copy of the signal as it is processed by the downstream components such as direction limiting component 706, etc. Resistor 712 may be fixed, variable, or programmable. Direction limiting component 706 may be a circulator or any type of circuit that can prevent transmission of Rx received by antenna A2 to splitter 704 and thereby to adjustment circuit 710.

In one embodiment, impedance matching blocks 714 may be used to match the impedance of antennas A1 and/or A2. Impedance matching blocks 714 may be any type that can sense and/or match antenna impedance.

As shown in FIG. 7A, the transmitted signal Tx' is detected by antenna A1, and the signal Rx received by antenna A1 includes both Tx' and S components. Rx is sent via a passive channel 716 to a combining circuit 718. In the embodiment illustrated in FIG. 7A, combining circuit 718 may be a summing circuit.

In one embodiment, passive channel 716 may include a modifier circuit 720 for modifying the signal being transmitted by passive channel 716. Example modifications include, but are not limited to, modifying one or more of phase, delay, amplitude, or frequency response.

In the embodiment illustrated in FIG. 7A, adjustment circuit 710 includes a modifier circuit 722 for modifying the second copy of the signal to produce a modified second copy of the signal 724, which is sent to combining circuit 718, which produces output signal O. Example modifications include, but are not limited to, modifying one or more of phase, delay, amplitude, or frequency response.

In one embodiment, adjustment circuit 710 may include a compensation device 726 for adjusting the amplitude and/or phase of modified second copy of the signal 724 relative to the signal in passive channel 716, such that, when combined by combining circuit 718, an output O is produced containing S but containing little or no Tx'.

Figure 7B:
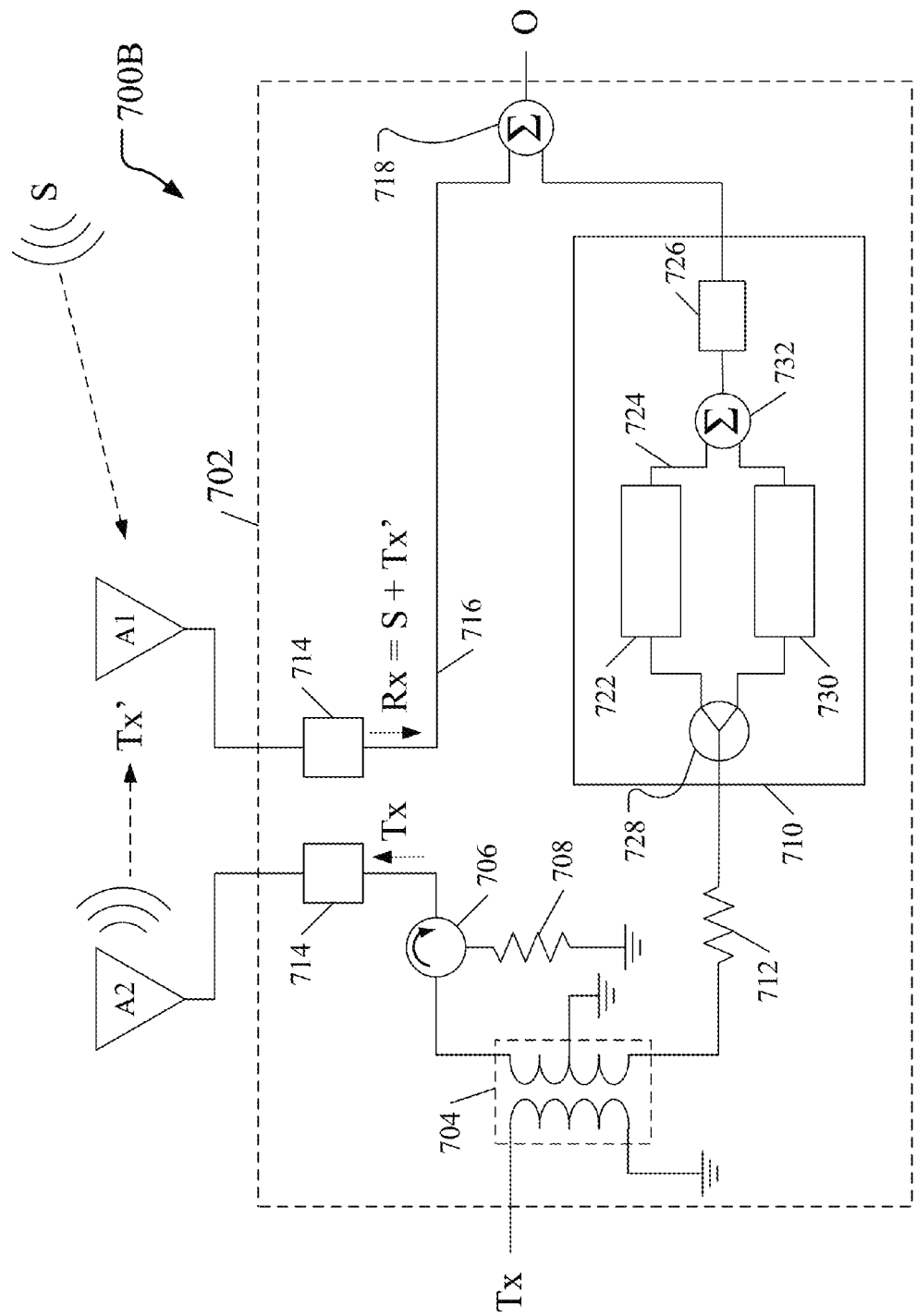

FIG. 7B is a circuit diagram illustrating an exemplary transceiver 700B with a wideband frequency and bandwidth tunable filter according to one embodiment of the subject matter described herein. Transceiver 700B is a variation of transceiver 700A in which adjustment circuit 710 additionally includes a splitter 728, a second modifier circuit 730 and a second combining circuit 732. In one embodiment, the operation of splitter 728, modifier circuits 722 and 730, and second combining circuit 732 may be substantially identical to the operation of splitter 132, modifier blocks 134 and 136, and summing circuit 140 of FIG. 1. For example, modifier circuits 722 and 730 may perform any type of modification, including modification of phase, delay, amplitude, impedance, etc. By adjusting the relative phase and/or delay of the signals output by modifier circuits 722 and 730, for example, the desired filter characteristic may be achieved. In the embodiment illustrated in FIG. 7B, adjustment circuit 710 includes one pair of modifier blocks, modifier circuits 722 and 730, but other numbers of modifier circuits are contemplated.

Figure 7C:
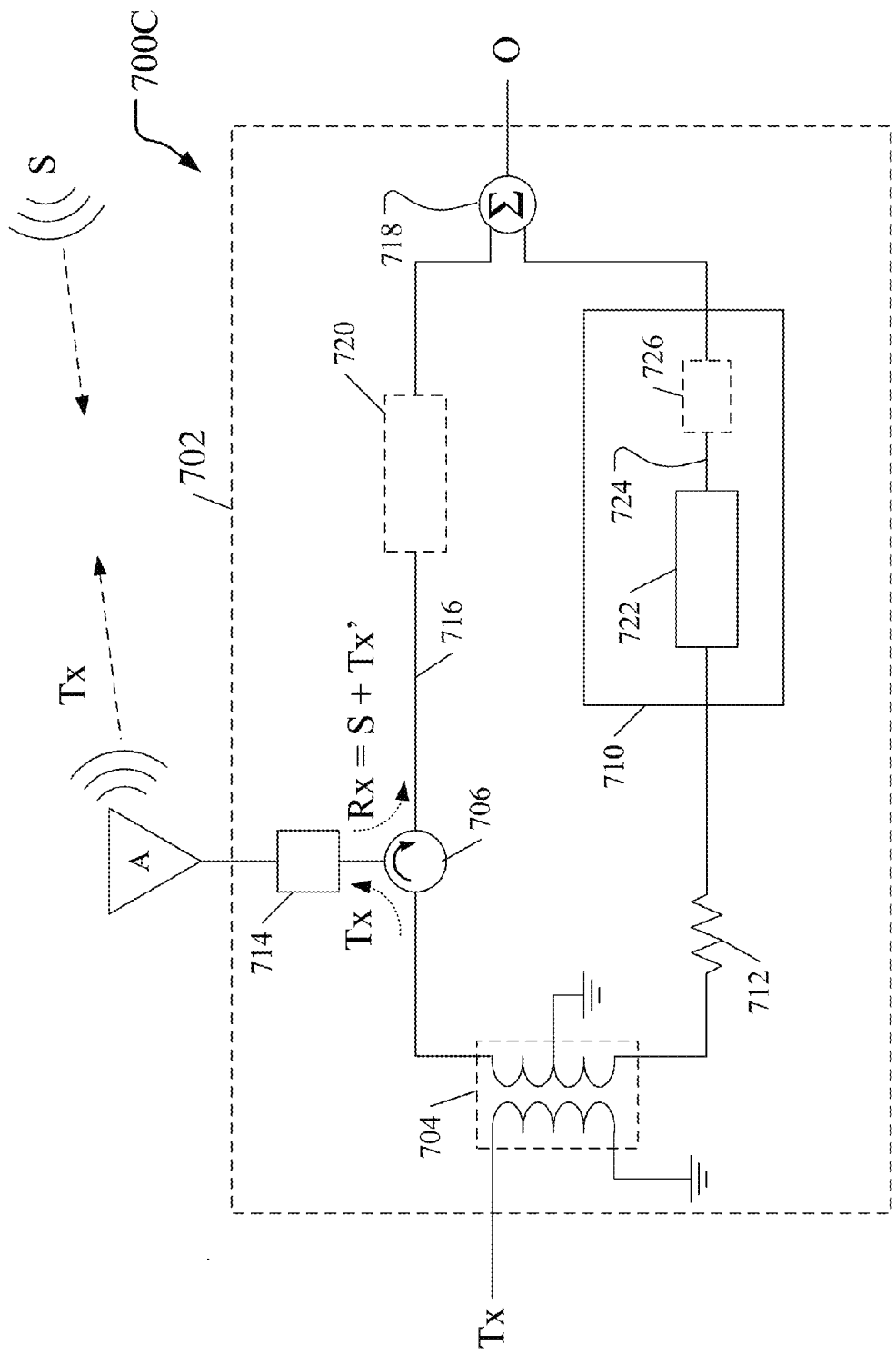

FIG. 7C is a circuit diagram illustrating an exemplary transceiver 700C with a wideband frequency and bandwidth tunable filter according to another embodiment of the subject matter described herein. In the embodiment illustrated in FIG. 7C, a single antenna A is used for both transmitting and receiving data. Data be transmitted Tx is provided to, and transmitted by, antenna A. Antenna A receives the desired signal S, but may also receive transmission interference Tx'. Examples of transmission interference include antenna reflections or other forms of interference caused by transmit data Tx. It is therefore desired that filter 702 will remove the interference Tx' from the received data Rx, which contains both S and Tx', to produce an output signal O that contains S but little or no Tx'. Direction limiting component 706 may include, but is not limited to, a circulator or any type of circuit that can prevent transmission of Rx from antenna A to splitter 704 and thereby to adjustment circuit 710. Direction limiting component 706 may be any type, including but not limited to a 3-port type, that can provide transmit signal Tx to antenna A while preventing Tx from reaching combining circuit 718, and that can provide received signal Rx (which includes antenna reflection Tx') to combining circuit 718 while preventing transmission of Rx towards splitter 704. In one embodiment, the functions of splitter 704, adjustment circuit 710, resistor 712, impedance matching device 714, passive channel 716, combining circuit 718, optional modifier circuit 720, modifier circuit 722, signal 724, and optional compensation device 726 may be substantially identical to their like-numbered parts in FIG. 7A, and their descriptions will not be repeated here.

Figure 7D:
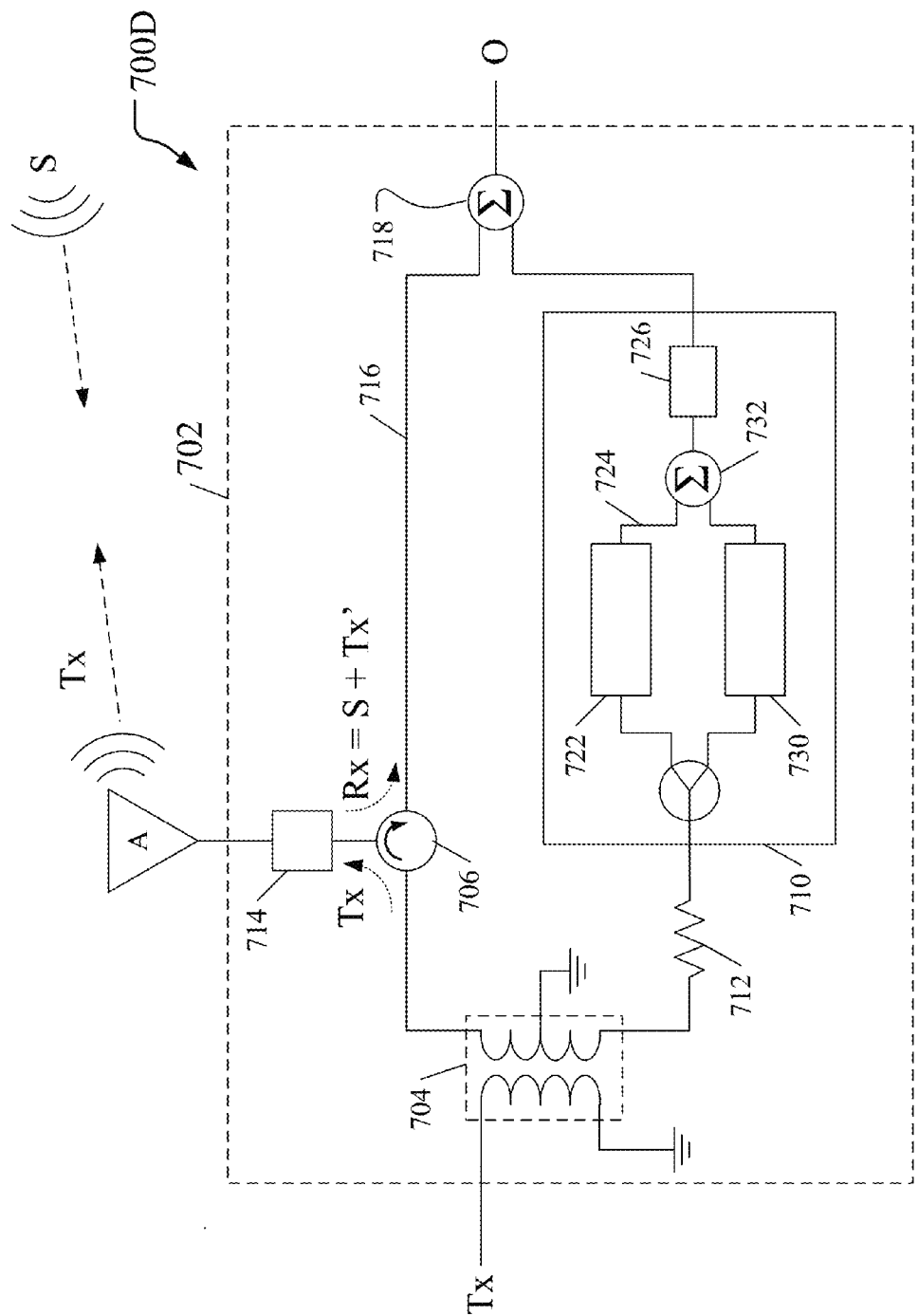

FIG. 7D is a circuit diagram illustrating an exemplary transceiver 700D with a wideband frequency and bandwidth tunable filter according to another embodiment of the subject matter described herein. Transceiver 700D is a variation of transceiver 700C in which adjustment circuit 710 additionally includes a splitter 728, a second modifier circuit 730 and a second combining circuit 732.

In one embodiment, adjustment circuit 710 may create a null passband filter response. Compensation device 726 may then adjust the phase and/or delay of the output of combining circuit 732 relative to the signal on passive channel 716 such that when they are summed at combining circuit 718, signals outside of the target frequency are suppressed and signals within the target frequency are not suppressed. In this manner, wideband or ultrawideband noise, interference, or distortion may be reduced. An example of this operation is shown in FIGS. 8A through 8C.

FIG. 8A is a graph showing the frequency components of Tx' and S signals recorded at filter output 104 of transceiver 700A during individual transmission of signals from Tx and S to show relative signal amplitudes and bandwidths.

FIG. 8B illustrates the signal Rx received by antenna A1 during simultaneous reception of the signals illustrated in FIG. 8A wherein the desirably received S signal is indistinguishable from the masking Tx' signal.

FIG. 8C illustrates the results of combining Tx feed signal with the Tx'-contaminated Rx signal according to the methods described herein to selectively cancel the Tx content to unmask the desirably received S signal. It will be appreciated that the wideband frequency and bandwidth tunable filters described herein have application in multiple input multiple output ("MIMO") configurations of radio, sensor, or other type of RF device. Configured for MIMO operation, such devices may comprise multiple antennas and additional components as needed. The systems and methods described herein are complementary to other methods, including beam steering, phased arrays, temporal blanking, etc.

Figure 9:
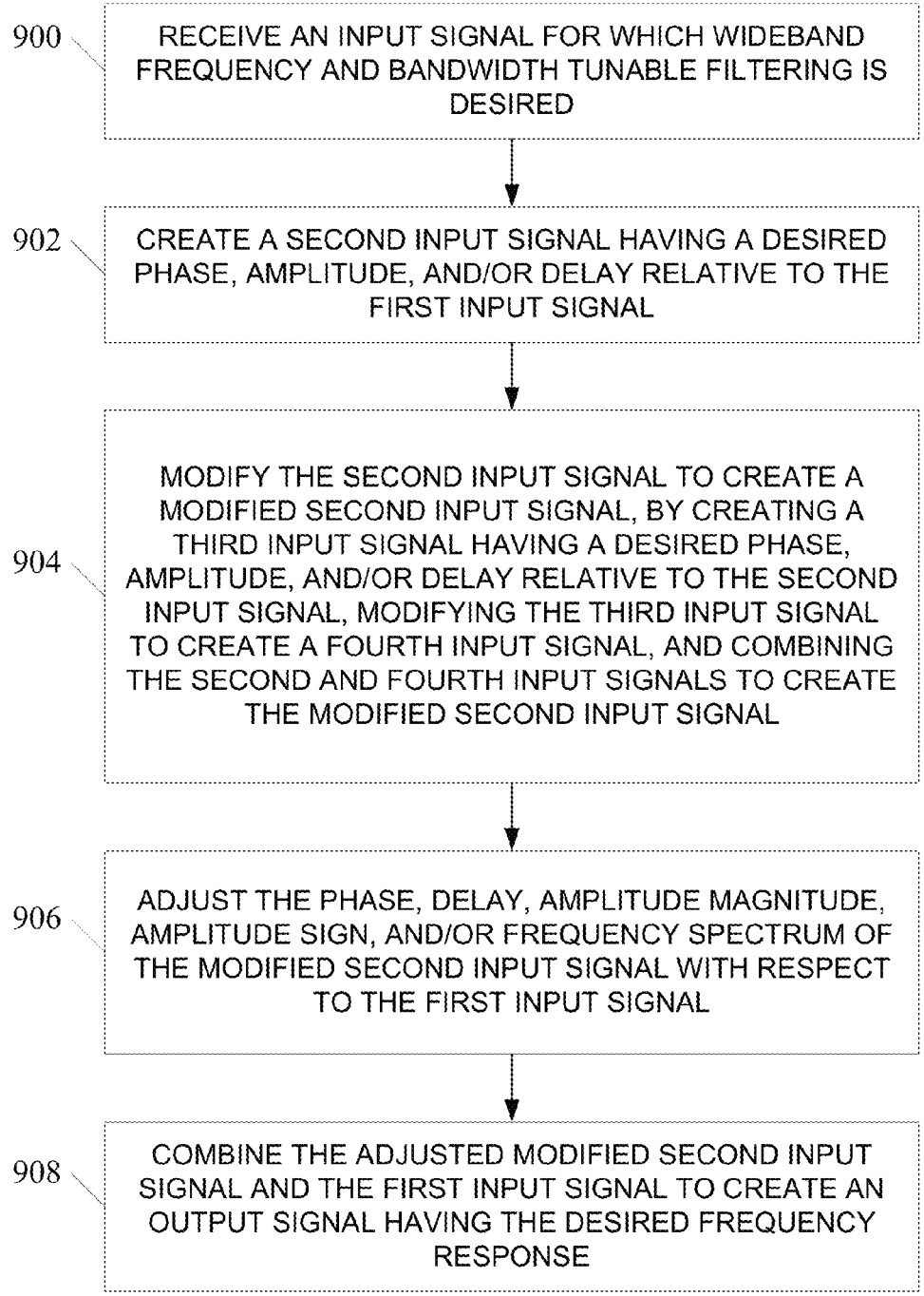
FIG. 9 is a flow chart illustrating an exemplary method for wideband frequency and bandwidth tunable filtering according to an embodiment of the subject matter described herein.

FIG. 9 is a flow chart illustrating an exemplary method for wideband frequency and bandwidth tunable filtering according to an embodiment of the subject matter described herein. At step 900, an input signal for which wideband frequency and bandwidth tunable filtering is desired is received. At step 902, a second input signal is created having at least one of a desired phase, amplitude, or delay relative to the first input signal. In one embodiment, the first input signal may be input into a splitter that creates a copy of the first input signal as the second input signal. At step 904, the second input signal is modified to create a modified second input signal having a desired frequency spectrum by creating a third input signal having a desired phase, amplitude, and/or delay relative to the second input signal, modifying the third input signal to create a fourth input signal, and combining the second and fourth input signals to create the modified second input signal. At step 906, at least one of phase, delay, amplitude magnitude, amplitude sign, and frequency spectrum of the modified second input signal is adjusted with respect to the first input signal. In one embodiment, the relative phases of the two signals may be calculated analytically, such as by using a deterministic algorithm. At step 908, the adjusted modified second input signal is combined with the first input signal to create an output signal having the desired frequency response.

In one embodiment, a method for wideband frequency and bandwidth tunable filtering method comprises at least one step of: A) receiving ("obtaining") at least one input signal, B) providing limiting signals by waveform amplifying and splitting amplified waveform to provide a plurality of limiting split signals, which are combined with plurality of input split signals to provide first and second restorer channel signals, C) modifying at least one channel signal according to the above-referenced international patent application number PCT/US11/49399, D) combining channel signals to provide a distortion free restorer passband output signal, E) providing restorer passband output signal to at least one of: passive signal combiner and other circuit. In some cases, providing restorer passband output signal comprises further modifying, e.g., by equalization and phase aligning with respect to passive signal.

Obtaining A can be conducted for electromagnetic signal of any frequency, e.g., radio frequency used in wireless data communication. Splitting of input signal is used to provide two input split signals having desirable phase relationship such as in-phase, anti-phase, or other. In some cases, such as for tunable filtering, input signal is split twice, the first splitting providing a first split signal to a passive signal channel and a second split signal provided to a second splitter, which second splitter provides two input split signals.

Providing a limiting signal B is conducted by generating a waveform, amplifying said waveform to create a substantially saturated or distorted ("limiting") signal and splitting said limiting signal to provide a plurality of (first and second) limiting split signals. Providing a limiting signal can comprise amplifying an input signal. Limiting split signals are combined with input split signals to provide restorer input signals ("channel signals").

Modifying C in some cases comprises providing at desired frequency ("center frequency") desirable phase difference between first and second channel signals such as anti-phase to create at least one type of interference of: destructive and constructive, at least at said center frequency. Desirable phase difference is determined and/or provided according to the inventive method. Combining D is provided by any type of device. Output providing E can be conducted with respect to combiner, further modifier, receiver or other circuitry. In some cases, providing restorer passband output signal D comprises providing a null passband type signal having substantially null power at a plurality of frequencies proximate center frequency.

Combining E comprises combining signals to provide an output signal of at least one type of: passband and null passband. In some cases, combining comprises combining restorer output with passive signal to provide a distortion free passband signal. In some cases, combining restorer output and passive signal further comprises modifying restorer output with respect to at least one of: amplitude, phase and delay. Combining E can comprise modifying output of passive signal and restorer combining.

Filtering, as described herein, comprises providing a substantially distortion free output signal having at least one desirable aspect of: center frequency, passband width, stopband and roll off, which signal is provided to a receiver of any type, e.g., cognitive radio receiver circuitry. Filtering can be any frequency type, such as fixed or tunable. Filtering is conducted by creating, modifying and combining first and second channel signal.

First channel signal is modified with respect amplitude and/or phase to create a passband signal with at least one desirable aspect of: center frequency, bandwidth and amplitude. Passband amplitude can be relatively high or low, the last described here as null amplitude. Output signal of high amplitude at one or more passband frequency is termed finite passband type. Output signal of null amplitude at one or more passband frequency is termed null passband type.

Finite passband type signal is provided to a secondary object as input signal. Finite passband signal is provided as a distortion free type signal although this is not required. Null passband type signal is combined with passive signal to form an output signal that is substantially free of distortion at one or more passband frequency.

Null passband signal is created by combining first channel signal and second channel signal, which are anti-phase with each other, with respect to limiting signal content and input signal content, such that combining substantially cancels signal amplitude at one or more passband frequency. For this, limiting can be provided a number of ways.

In one case, input signal is pre-amplified to produce a limited type input signal, which is split to provide two limited type split input signals having an anti-phase relationship, which limited split input signals are provided to restorer as first channel signal and second channel signal. First channel signal and/or second channel signal are modified and combined to create null passband signal. In another case, limiting split signals can be provided that are anti-phase with respect to each other and combined with input split signals that are anti-phase to each other, to provide first channel signal and second channel signal that are anti-phase to each other with respect to limiting and input signal contents. In either case, combining provides destructive interference at one or more passband frequency, resulting in a combined signal having substantially null amplitude at one or more passband frequency.

Combining null passband signal and passive signal provides an output signal that is substantially free of distortion at passband frequencies. It will be apparent that the method can be practiced successively to provide a desirable level of out-of-band amplitude reduction as means of reducing total signal power to enable linear operation of active circuits to which output signal is provided.

Duplexing, as described herein, comprises providing transmit (Tx) signal, splitting Tx signal to provide first Tx split signal as an input to a cancelling circuit to be modified and combined with an antenna signal comprising both S and Tx contents according to the method as means of selectively canceling the Tx content as means of providing full duplex transceiving that increases efficiency of spectrum utilization relative to systems using Tx and Rx signals that are widely separated in time or frequency to avoid self-interference at the cost of reducing efficiency of spectrum utilization.

GPS receiving, as described herein, comprises at least one step of: obtaining two antenna signals as input signals, pre-amplifying at least one input signal to provide enhanced dynamic range, providing limiting split signals, combining split limiting signals and antenna signal to provide a plurality of channel signals, modifying at least one channel signal and combining channel signals to provide a GPS output signal comprising at least one type of: distortion free and interference reduced, with respect to GPS frequency.

It will be apparent that the method for GPS receiving can be practiced using a plurality of sets of antenna for providing input signals, with output signals being further modified and subsequently combined to provide a further enhanced GPS signal. It will be appreciated that such receiving can be applied any system providing a plurality of input signals, e.g., to defeat a plurality of inadvertent or adversarial sources of jamming.

Linear amplifying, as described herein, comprises at least one of: obtaining and splitting a desirably amplified type of input signal to provide a plurality of in-phase input split signals, providing a limiting signal, splitting limiting signal to provide a plurality of anti-phase limiting split signals, combining input split signals and limiting split signals to provide a plurality of channel input signals, modifying and combining channel signals to provide an amplified type output signal substantially free of distortion.

Operating an RF device, as described herein, e.g., operating a cognitive radio, comprises using at least one device described herein of: duplexer, filter and linear amplifier. Operating comprises at least one step of: obtaining a desirably transmitted signal, amplifying said signal, duplexing said amplified signal and transmitting said amplified signal, filtering an antenna signal, providing a desirable passband signal as output signal. Desirable output signal is substantially free of at least one of: distortion, interference and antenna reflection content. Operating further comprises receiving output signal and conducting at least one of, mixing, further filtering, digitizing, and processing, said processing comprising at least one of providing data to a user and providing data to at least one device of duplexer, filter and linear amplifier.

Communicating, as described herein, comprises using at least one disclosed device in transmitting and receiving desirable signals at the same time and frequency using one antenna. Communicating comprises tuning to a desirable frequency, e.g., one having available capacity. Communicating comprises providing a linear Tx signal to antenna and/or providing a linear Rx signal to receive electronics. Communicating comprises with respect to Rx providing at least one of: conditioning, digital converting, processing, analog converting and providing at least one of: digital signal and analog signal to at least one of: other portion of inventive device, secondary device and user.

Sensing, as described herein, comprises detecting interference burdened signals, removing interference, preventing distortion and providing an output signal comprising a passband substantially free of interference and/or distortion, said output signal then being provided to at least one of: receive electronics, secondary device, user or at least one portion of inventive device, e.g., for control purposes. Sensing comprises at least one of: detecting, isolating and processing desirably received signals, e.g., GPS type to determine at least one of: location, direction and speed.

Distortion preventing, as described herein, comprises modifying and combining first antenna signal and second antenna signal according to a method of commonly assigned, co-pending U.S. patent application Ser. No. 13/271,420, the disclosure of which is incorporated herein by reference in its entirety, and creating a null passband as described in the above-referenced international application number PCT/US11/49399, enhanced by pre-limiting signal use as described above.

In some cases, sensing comprises providing a first distortion free type bandpass signal and a second distortion free bandpass signal, shifting phase of first bandpass signal to provide anti-phase relationship of interference content of said first bandpass signal with respect to interference content of second bandpass signal s and combining said bandpass signals to isolate a final output signal that is substantially free of distortion and/or interference. In some cases, sensing comprises combining a plurality of final output signals, one or more being modified according to the present invention before combining.

It will be apparent that the subject matter described herein can comprise a portion of a device and/or method wherein operating active circuits in the presence of high input power is desirable.

Although presented in terms of specific embodiments, two inputs, and a single stage, the present description is intended to cover all type of device and numbers inputs and numbers of stages of at least one of: duplexer, filter, and amplifier.

Figure 10A:
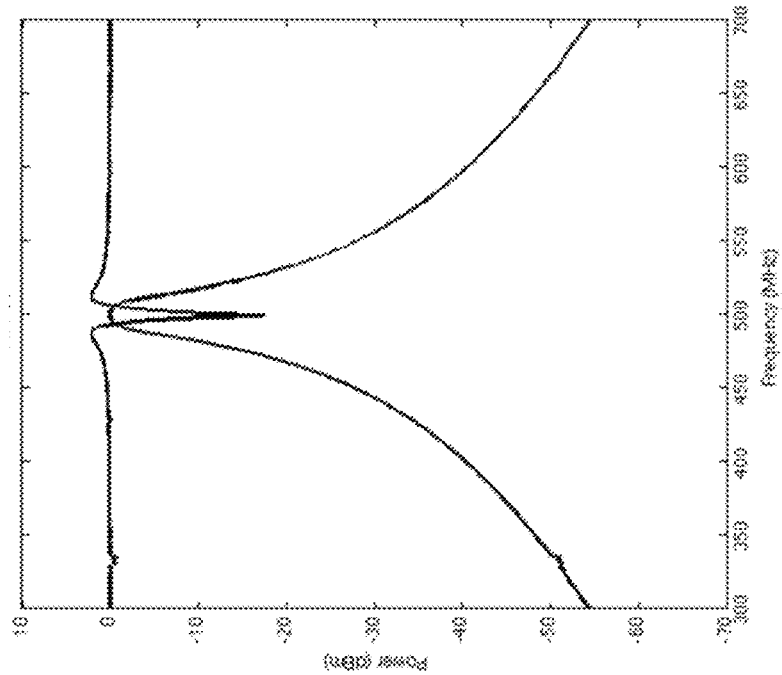
FIGS. 10A and 10B illustrate the response of a wideband frequency and bandwidth tunable filter according to an embodiment of the subject matter described herein.
Figure 10B:
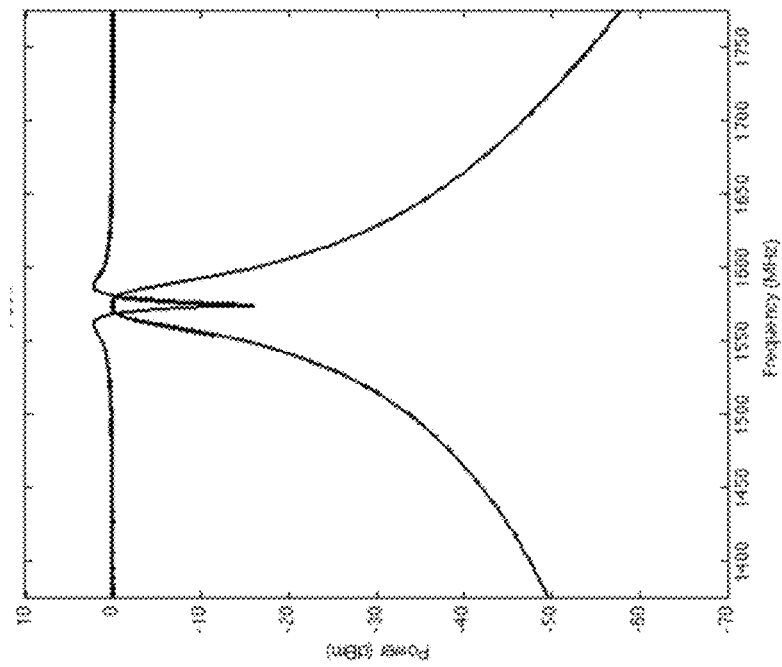

FIGS. 10A and 10B illustrate the response of a wideband frequency and bandwidth tunable filter according to an embodiment of the subject matter described herein. FIGS. 10A and 10B show the null passband frequency response of the adjustment circuit 126 and the high quality passband frequency response of the entire filter 100 at different center frequencies: 1575 MHz in FIG. 10A, and 500 MHz in FIG. 10B. It can be seen that the wideband frequency and bandwidth tunable filters as described herein operate very well even at different frequencies.

The foregoing description of embodiments of the subject matter described herein has been presented for purposes of illustration and description. It is not intended to be exhaustive or to limit the subject matter described herein to the precise form disclosed, and modifications and variations are possible in light of the above teachings or may be acquired from practice of the subject matter described herein. The embodiment was chosen and described in order to explain the principles of the invention and its practical application to enable one skilled in the art to utilize the subject matter described herein in various embodiments as are suited to the particular use contemplated. It is intended that the scope of the invention be defined by the claims appended hereto, and their equivalents. The entirety of each of the aforementioned documents is incorporated by reference herein.

It will be understood that various details of the subject matter described herein may be changed without departing from the scope of the subject matter described herein. Furthermore, the foregoing description is for the purpose of illustration only, and not for the purpose of limitation.

What is claimed is:

1. A wideband frequency and bandwidth tunable filter, comprising:
   a first splitter for receiving a filter input signal and producing a first input signal and a second input signal;
   a first modifier block for modifying the first input signal to produce a first output signal;
   an adjustment circuit for modifying the second input signal to produce a second output signal having an intermediate frequency response;
   a first signal combiner for combining the first output signal and the second output signal to produce a filter output signal; and
   a compensation device for adjusting at least one of a phase of the first output signal relative to a phase of the second output signal and an amplitude of the first output signal relative to an amplitude of the second output signal such that the filter output signal has a desired frequency response,
   wherein the adjustment circuit comprises:
      a second splitter for receiving the second input signal and producing a third input signal and a fourth input signal;
      a second modifier block for modifying the third input signal to produce a third output signal;
      a third modifier block for modifying the fourth input signal to produce a fourth output signal; and
      a second signal combiner for combining the third output signal and the fourth output signal to produce the second output signal having the intermediate frequency response.

2. The tunable filter of claim 1, comprising a conditioning circuit for conditioning at least one of the third input signal and the fourth input signal.

3. The tunable filter of claim 2 wherein the conditioning circuit includes a saturation circuit for at least partially saturating an input to the conditioning circuit with respect to at least one target frequency.

4. The tunable filter of claim 1 wherein the compensation device adjusts a phase of the first output signal relative to a phase of the second output signal according to a feed-forward method.

5. The tunable filter of claim 1 wherein the compensation device adjusts a phase of the first output signal relative to a phase of the second output signal by performing a deterministic algorithm.

* * * * *